US011396913B2

(12) United States Patent
Shirosaki et al.

(10) Patent No.: US 11,396,913 B2
(45) Date of Patent: Jul. 26, 2022

(54) TWO-SPEED TRANSMISSION FOR ELECTRIC DRIVING VEHICLE

(71) Applicant: UNIPRES CORPORATION, Yokohama (JP)

(72) Inventors: Ryo Shirosaki, Fuji (JP); Ryosuke Suzuki, Fuji (JP); Hideyuki Nezu, Fuji (JP); Takashi Matsuura, Fuji (JP); Yuuta Oono, Fuji (JP); Atsushi Kobayashi, Fuji (JP); Yutaka Murata, Fuji (JP); Yoichi Furuichi, Fuji (JP)

(73) Assignee: UNIPRES CORPORATION, Yokohama (JP)

(*) Notice: Subject to any disclaimer, the term of this patent is extended or adjusted under 35 U.S.C. 154(b) by 48 days.

(21) Appl. No.: 17/043,797

(22) PCT Filed: Nov. 30, 2018

(86) PCT No.: PCT/JP2018/044209
§ 371 (c)(1),
(2) Date: Sep. 30, 2020

(87) PCT Pub. No.: WO2019/230021
PCT Pub. Date: Dec. 5, 2019

(65) Prior Publication Data
US 2021/0071721 A1 Mar. 11, 2021

(30) Foreign Application Priority Data
Jun. 2, 2018 (JP) .............................. JP2018-106548

(51) Int. Cl.
F16D 27/115 (2006.01)
F16D 13/52 (2006.01)
(Continued)

(52) U.S. Cl.
CPC ............ F16D 27/115 (2013.01); F16D 13/52 (2013.01); F16D 27/118 (2013.01); B60L 15/00 (2013.01);
(Continued)

(58) Field of Classification Search
CPC ...... F16D 27/12; F16D 27/115; F16D 27/118; F16D 13/52; F16D 11/14
See application file for complete search history.

(56) References Cited

U.S. PATENT DOCUMENTS

2013/0029804 A1* 1/2013 Misala ..................... F16H 3/54
903/902
2018/0231105 A1* 8/2018 Kimes ..................... H02K 7/11

FOREIGN PATENT DOCUMENTS

DE 102019104030 A1 * 8/2020
JP S63-53042 U 4/1988
(Continued)

OTHER PUBLICATIONS

International Search Report with English translation and Written Opinion issued in corresponding application No. PCT/JP2018/044209 dated Feb. 26, 2019.

Primary Examiner — Stacey A Fluhart
(74) Attorney, Agent, or Firm — Foley & Lardner LLP

(57) ABSTRACT

The present invention relates to a two-speed transmission for an electric driving vehicle and the two-speed transmission for an electric vehicle has only one actuator. The transmission comprises a planetary gear mechanism (12), an elastic body (44), an armature (26) to integrally rotate with an input axis, an electromagnetic coil (46) and a multi-plate friction clutch (30). A ring gear (20) is fixed to a housing. The armature (26) comprises clutch projection portions (26-1). A dog clutch is constituted by the clutch projection portions (26-1) and recess portions (18-2) of a sun gear (18). When the electromagnetic coil (46) is not electrically energized,
(Continued)

the dog clutch is engaged. The rotation of the input axis is reduced and is transmitted to an output axis via the sun gear (18) and a carrier (16). When the electromagnetic coil (46) is electrically energized, the armature (26) is displaced against elastic force, the dog clutch becomes a non-engaging state, a multi-plate friction clutch (30) becomes an engaging state by pressing flange portions (26-4) of the armature (26) and the rotation of the input axis is transmitted to the output axis with a one-to-one relationship. The transmission can comprise a one-way clutch to prevent torque interruption when switching the gear ratio.

7 Claims, 15 Drawing Sheets

(51) Int. Cl.
*F16D 27/118* (2006.01)
*B60L 15/00* (2006.01)
*F16D 27/00* (2006.01)
*F16D 23/12* (2006.01)
*F16D 11/14* (2006.01)

(52) U.S. Cl.
CPC ... *B60L 2240/421* (2013.01); *B60L 2240/423* (2013.01); *F16D 11/14* (2013.01); *F16D 27/004* (2013.01); *F16D 2023/123* (2013.01)

(56) References Cited

FOREIGN PATENT DOCUMENTS

| JP | 2006-234062 A | 9/2006 |
| JP | 2013-245736 A | 12/2013 |
| JP | 5568229 B | 8/2014 |
| JP | 2016-109146 A | 6/2016 |

\* cited by examiner

TWO-SPEED TRANSMISSION FOR ELECTRIC DRIVING VEHICLE

TECHNICAL FIELD

The present invention relates to a two-speed transmission for an electric driving vehicle.

BACKGROUND ART

Normally, in electric vehicles (EV) whose driving force is obtained from an electric motor, hybrid vehicles that the driving force is obtained by switching between an engine and the electric power or is obtained from both the engine and the electric power, and vehicle that runs by using only the driving force of the electric motor, transmission to the axle side driving force of the electric motor is provided with only a reduction mechanism that reduces the rotation of the electric motor to the rotational number (rpm) which is appropriate for running without installing other transmissions. This structure is adopted because the driving torque can be generated from a stand-by region in the electric motor, the electric motor has the wide usable rotational regions, and the features that the structure is simple and other transmissions in which the structure is complicate are not needed, are important selling points of the EV.

However, even in the EV, advantages that the transmission is utilized are existed. Even in the electric motor, it is hard to keep on working at a high efficiency in the all vehicle velocity region, and particularly the rotational number of the electric motor becomes higher in the high vehicle velocity driving region of the vehicle and then the efficiency is lowered. For improving the above efficiency, a two-speed transmission is disposed between the electric motor and the reduction mechanism. In the above high vehicle velocity driving region of the vehicle that the efficiency is lowered, the low reduction ratio side is used in the two-speed transmission and then the high vehicle velocity driving of the vehicle can be realized even when the rotational number of the electric motor is reduced. Thereby, the high efficiency region of the electric motor can widely be used. As such a two-speed transmission, in Patent Document 1, the first electromagnetic clutch and the second electromagnetic clutch are installed. In the low velocity region, the rotation of the electric motor is transmitted to the output side via the first reduction mechanism by the first clutch, and in the high vehicle velocity driving region, the rotation of the electric motor is transmitted to the output side via the second reduction mechanism by the second clutch. In the same rotational number of the same electric motor, the output axis rotational number reduced by the second reduction mechanism is higher than the output axis rotational number reduced by the first reducer. Thus, comparing with the low velocity region, in the high vehicle velocity driving region, since the reduction ratio becomes the small value, the high velocity running can be performed with reducing the rotational number of the electric motor, the efficiency in the all vehicle velocity region can be improved.

THE LIST OF PRIOR ART DOCUMENTS

Patent Documents

Patent Document 1: Japanese Patent No. 5568229 B2

SUMMARY OF THE INVENTION

Problems to be Solved by the Invention

In the prior art, the two-speed transmission between the large reduction ratio (the first speed gear) in the low velocity region and the small reduction ratio (the second speed gear) in the high vehicle velocity driving region are performed. Even in both the large and small reduction ratios, the respective reduction ratios by the electromagnetic clutch engagement are ensured. In order to keep the electromagnetic clutch engagement in both the large and small reduction ratios, the electromagnetic force is needed. Consequently, the electric power consumption amount increases, and the load to the battery also increases. In the EV, for reducing the load to the battery, saving the electric power consumption amount in the low velocity region which is frequently used is required. In the above viewpoint, an improvement from the conventional structure has been desired. Conventionally, installing the two actuators (two armatures) for the respective clutches is needed. This is a factor that the size of the transmission increases, and a disadvantage in the layout restriction due to an increase in size is occurred.

The present invention has been developed in view of the above-described technical problems of the prior art, and an object of the present invention is to use only one actuator in the two-speed for the electric vehicle, reduce the load of the electric power consumption and resolve the layout restriction of the transmission.

Means for Solving the Problems

A two-speed transmission for an electric driving vehicle disposed on an output axis of an electric motor according to the present invention in a vehicle which uses the electric motor for driving wheels, comprising: a housing fixed to a vehicle body side, a planetary gear mechanism which is disposed in the housing and comprises three rotational components including a carrier to rotatably support plural pinions disposed at a circumferential direction with an interval, a first gear whose rotational center is common to the carrier and which meshes with the pinions, and a second gear whose rotational center is common to the carrier, whose tooth number is different from a tooth number of the first gear, and which meshes with the pinions, an elastic body, an electromagnetic coil, an armature which is movable along an input axis, is rotated with the input axis, is moved to and is urged to a first direction by the elastic body, and is moved to and is urged to a second direction which is opposite to the first direction by an electromagnetic force generated from the electromagnetic coil, a first clutch which is engaged by movement of the armature to the first direction by an elastic force of the elastic body when the electromagnetic coil is not electrically energized, and is not engaged by movement of the armature to the second direction by the electromagnetic force against the elastic force when the electromagnetic coil is electrically energized, and a second clutch which is engaged by the movement of the armature to the second direction by the electromagnetic force against the elastic force when the electromagnetic coil is electrically energized, and is not engaged by the movement of the armature to the first direction by the elastic force when the electromagnetic coil is not electrically energized, wherein a ring gear or a sun gear as a first rotational component of the planetary gear mechanism is fixed to the housing side, arrangements of second and third rotational components which are rest rotational components, and the first and second clutches between an input side and an output side are determined so that rotational number of an input side is equal to that of an output side when one of the first and second clutches is engaged and the other of the first and second clutches is not engaged, and the rotational number of the input side rotational component is not equal to that of the output side rotational component and a rotational direction of the input side rotational component is same as that of the output side rotational component when one of the first and second clutches is not engaged and the other of the first and second clutches is engaged, and wherein, comparing a first case that the first clutch is engaged and the second clutch is not engaged by the movement of the armature to the first direction under the elastic force when the electromagnetic coil is not electrically energized with a second case that the first clutch is not engaged and the second clutch is engaged by the movement of the armature to the second direction under the electromagnetic force against the elastic force when the electromagnetic coil is electrically energized, the output side to the input side in the first case rotates more slower than that in the second case.

It is preferable that the first clutch is a dog clutch and the second clutch is a friction clutch. As the more preferable configuration, the dog clutch comprises a first portion which is integrated with the armature and a second portion which is integrated with the planetary gear mechanism side including the housing. The first portion is engaged with the second portion by the movement of the armature to the first direction and the dog clutch is engaged. The first portion is separated from the second portion by the movement of the armature to the second direction and the dog clutch is not engaged. The armature is integrated with friction clutch driving portions, the friction clutch driving portions are separated from an opposite surface of the friction clutch and the friction clutch is not engaged in the movement of the armature to the first direction, and the friction clutch is engaged by the movement of the armature to the second direction. In the structure of the transmission according to the present invention, two-speed transmission is realized by engaging and non-engaging the two clutches which move like a seesaw. In this case, in order to keep the surely switch operation regardless of the parts tolerance or the like, when the switch from the first speed to the second speeds or the switch from the second speed to the first speed is performed, an intermediate state that the two clutches become a non-engaging state has to be provided. Although this intermediate state is continued for extremely short time, the shift shock can be occurred by torque interruption. As the countermeasure of such torque interruption, in the intermediate state, a one-way clutch can be provided in order to surely transmit the driving force of the rotational axis of the electric motor side to the output axis side. As such a one-way clutch, one use that the rotation of the input axis when switching is transmitted to the output side so that the rotation of the output side is not lowered, and the other use that driving force transmission is ensured by disposing the one-way clutch between a ring gear that is the rotational component which should be fixed and a sun gear, and locking the ring gear or the sun gear to the housing side when switching.

Effects of the Invention

In the two-speed transmission of the present invention, comparing with the second case that the first clutch is not engaging and the second clutch is engaging against the elastic force when the electromagnetic coil is not electrically energized, in the first case that the first clutch is engaging and the second clutch is not engaging under the elastic force when the electromagnetic coil is electrically energized, the output side to the input side is more reduced the velocity. Therefore, the first case is covered to the low velocity region and the second case is covered to the high vehicle velocity driving region. In the normal driving region which is a low velocity, because the electric power is not required for the first clutch engagement, the electric power consumption efficiency can be improved. In the high vehicle velocity driving region, since the reduction ratio becomes small, the rotational number of the electric motor can be lowered and the electric motor can operate in the high efficiency region. These features can also lead to improve the electric power consumption efficiency. It makes possible to switch the engagement with the first clutch and the second clutch efficiently by one movement of the armature back and forth by the electromagnetic force. Since the rotational number of the electric motor is reduced in the high vehicle velocity region and the efficiency of the electric motor is improved, the performance in the maximum vehicle velocity region can be improved and an increase in the maximum vehicle velocity can be achieved.

Further, in the driving force transmission in the low velocity region, because the dog clutch integrated with the armature is used, the shift shock which becomes the problem is not occurred and the high efficient driving force transmission can be achieved with a simple structure. These features can lead to improve the energy efficiency in the low velocity region. The advantage of the costs can also be enhanced because of a reduction in the number of the components.

Furthermore, the torque interruption when switching (operating the transmission) is prevented by the installation of the one-way clutch, and this feature has an advantage that the shift shock which the driver can feel is reduced.

MODE FOR CARRYING OUT THE INVENTION

Figure 1:
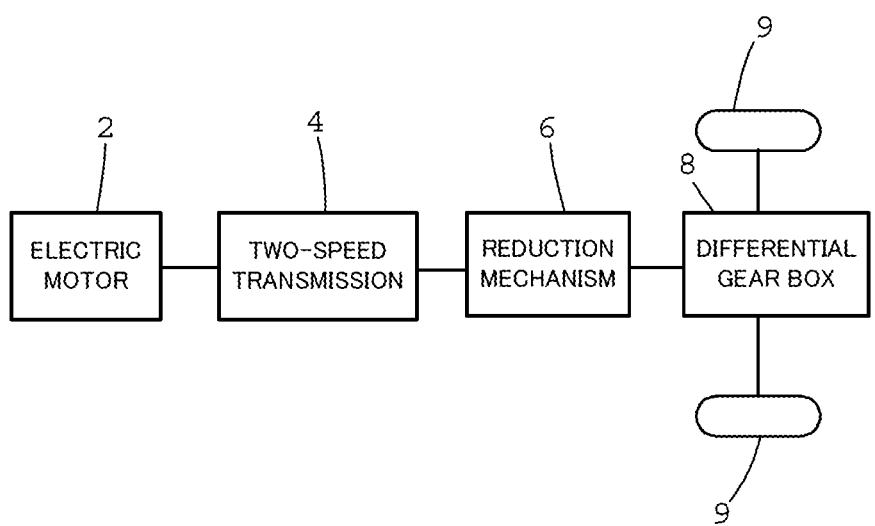
FIG. 1 is a schematic view of a wheel driving train of an electric vehicle according to the present invention.

FIG. 1 is a schematic view of a wheel driving train of an electric vehicle according to the present invention. The reference numeral 2 denotes an electric motor for running, the reference numeral 4 denotes a two-speed transmission of the present invention, the reference numeral 6 denotes a reduction mechanism, the reference numeral 8 denotes a differential gear box and the reference numeral 9 denotes wheels. The reduction mechanism 6 is configured to the meshing with gears which are installed in a casing, and is disposed for reducing the high velocity rotation of the electric motor 2 to the rotational number which is appropriate for a running by the wheels 9. In a case of the normal electric vehicle that the two-speed transmission 4 is not disposed, the setting value of the reduction ratio in the reduction mechanism 6 is roughly eight. This value is suitable for the normal low vehicle velocity driving in which the electric motor 2 is operated in the high efficient rotational number region. In this setting, since the rotational number of the electric motor in the high vehicle velocity driving increases too much and the efficiency does not become the suitable value, the two-speed transmission 4 is disposed. In the first embodiment as described below, the reduction ratio of the first-speed gear is set to "2.4" and the reduction ratio of the second-speed gear is set to "1.0" (direct coupling). If the reduction ratio of the reduction mechanism 6 is set to "3.41", the total reduction ratio is "8.18" (=2.4×3.41) and becomes a substantially total reduction ratio in a case of the conventional reduction mechanism which is not the two-speed transmission. In a case that the vehicle is driven by the second-speed gear, the total reduction ratio is "3.41" (=1.0× 3.41). Because the total reduction ratio is smaller than that in the conventional reduction mechanism in the high vehicle velocity driving region, the electric motor 2 enables to be driven in a low rotational region in which the efficiency is higher than that in the conventional reduction mechanism.

Figure 2:
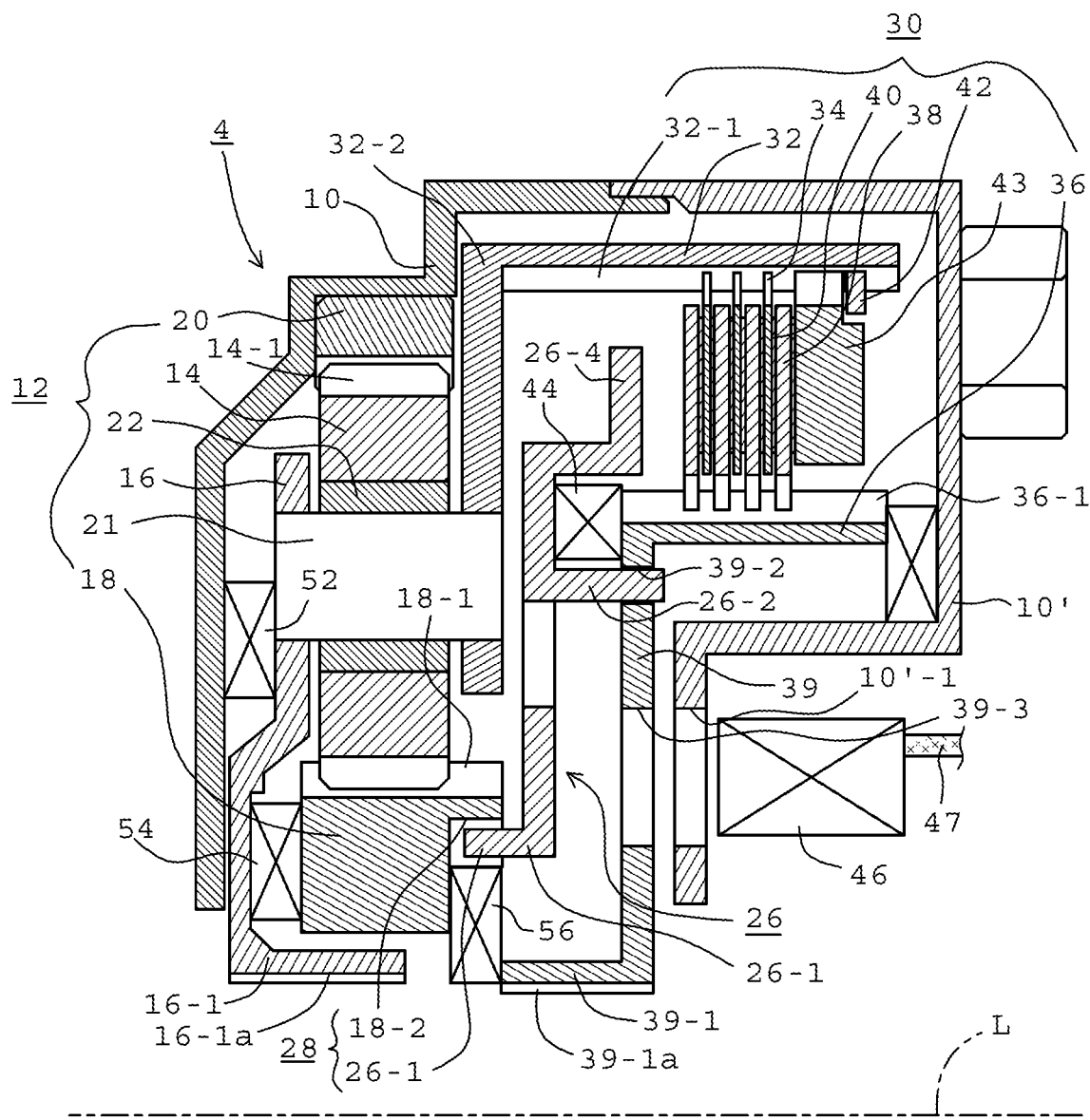
FIG. 2 is a cross-sectional view of an upper side portion along a central axis of a two-speed transmission apparatus of the first embodiment according to the present invention, and shows a state that a dog clutch is engaged and a friction clutch is not engaged.

FIG. 2 is a cross-sectional view of the two-speed transmission for the electric vehicle according to the present invention and an upper side portion along a central axis "L" is depicted. The reference numeral 10 denotes the housing, and the housing 10 and a cover 10' which is welded to the housing 10 forms a closed cavity (lubricant oil is filled for lubricating the mesh portion of the gears) which receives the structure of the two-speed transmission 4 according to the present invention in an interior thereof. A planetary gear mechanism 12 is disposed in the housing 10, and comprises three rotational components including a carrier 16 to rotatably support plural pinions disposed at a circumferential direction with an interval, a sun gear whose rotational center is common to the carrier and which meshes with the pinions, and a ring gear 20 whose rotational center is common to the carrier and which meshes with the pinions. Pins 21 for supporting the respective pinions 14 to the carrier 16 are disposed (pins 21 are fixed to the carrier 16). The reference numeral 22 denotes a needle bearing.

Figure 3:
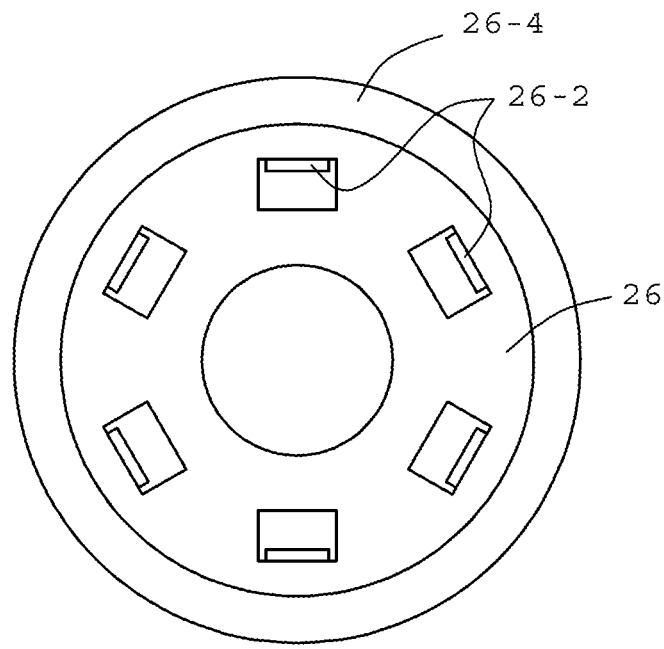
FIG. 3 is a front view of the clutch driving plates of FIG. 2 viewed from an input axis side.
Figure 4:
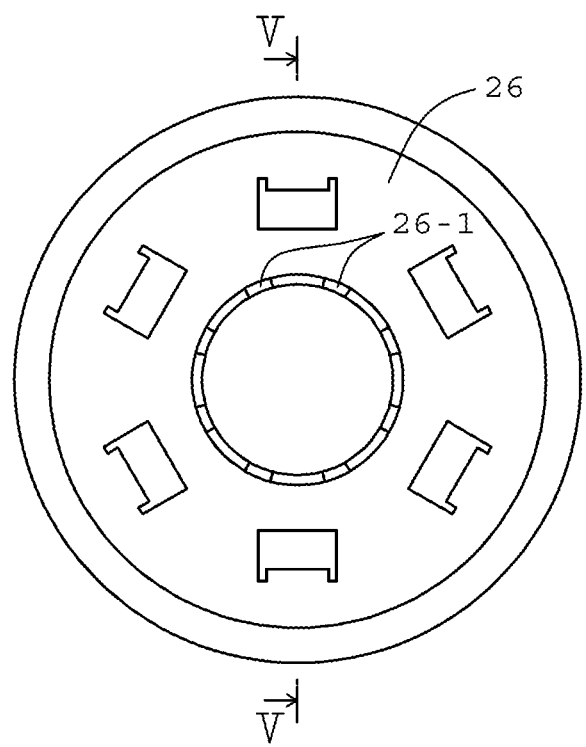
FIG. 4 is a back view of the clutch driving plates viewed from an opposite side (an output axis side) of FIG. 3.
Figure 5:
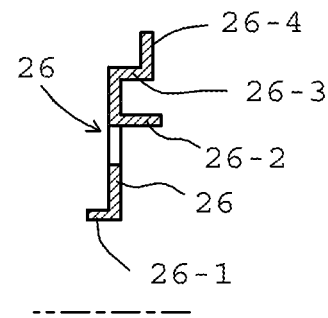
FIG. 5 is a back view of the clutch driving plate taken along a V-V line of FIG. 4.
Figure 5:
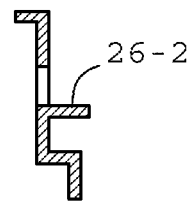

In the first embodiment according to the present invention, an armature 26 (FIGS. 3 to 5) is integrated with a dog clutch 28 which is described below, and is also integrated with a driving portion of a friction clutch 30 which is described below. The dog clutch 28 and the friction clutch 30 enable to switch engagement with the dog clutch and the friction clutch by ON-OFF operation of an electromagnetic coil 46, in other words, by one movement. The armature 26 is an annular disk form as a whole. The armature 26 includes eight clutch projection portions 26-1 which are disposed with an equal interval in a circumferential direction of an inner circumference and are extended toward the sun gear 18 in the axial direction, six support portions 26-2 which are disposed with an equal interval in a circumferential direction of an intermediate portion and are extended to the axial direction opposite to the clutch projection portions 26-1, outer cylindrical portions 26-3 which are extended to the axial direction opposite to the clutch projection portions 26-1 and flange portions 26-4 (friction clutch driving portions) which are extended in the radial direction at the end portion of the respective cylindrical portions 26-3.

Figure 6:
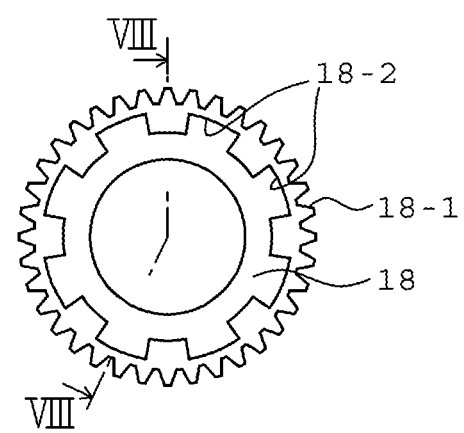
FIG. 6 is a front view of a sun gear of FIG. 2 viewed from the input axis side.
Figure 7:
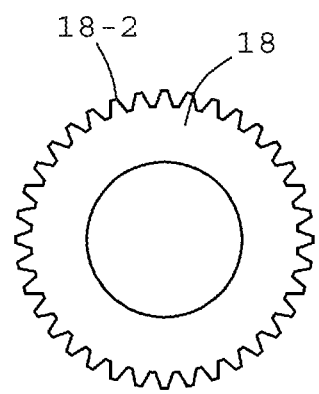
FIG. 7 is a back view of the sun gear of FIG. 6 viewed from the opposite side (the output axis side)
Figure 8:
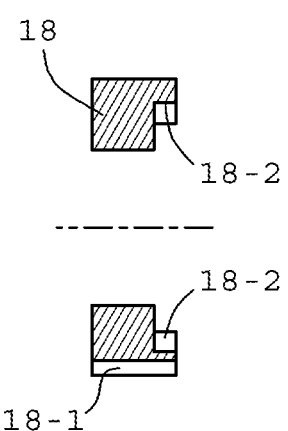
FIG. 8 is a back view of the sun gear taken along a VIII-VIII line of FIG. 6.

The sun gear 18 (FIGS. 6 to 8) of the planetary gear mechanism 12 includes tooth portions 18-1 which mesh with tooth portions 14-1 of the pinion 14 at the outer circumference, and eight clutch recess portions 18-2 which are separately disposed to the opposite surface against the armature 26 of the sun gear 18 in the circumferential direction. The eight clutch recess portions 18-2 of the sun gear 18 are oppositely and respectively disposed to the eight clutch projection portions 26-1. The dog clutch 28 of the first embodiment according to the present invention comprises the eight pairs in which the clutch projection portions 26-1 are opposite to the clutch recess portions 18-2. That is, the clutch projection portions 26-1 are integrated with the clutch recess portions 18-2 in the rotational direction by relatively moving to the facing direction of the axial direction and meshing with each other (the dog clutch is engaged). The engagement of the clutch projection portions 26-1 and the clutch recess projections 18-2 is released by relatively moving to the separation direction of the axial direction (the dog clutch is not engaged).

The carrier 16 includes a cylindrical portion 16-1 at the rotational center, the cylindrical portion 16-1 includes spline tooth portions 16-1a on the inner circumferential surface, and an output axis (not shown) to the axle side (differential gear box side) is spline-fitted to these spline tooth portions 16-1a. The armature 26 includes the six support portions 26-2 which are projected from the planetary gear mechanism 12 in the radial direction at the intermediate portion to the separation side in the axial direction and are disposed with an equal interval in the circumferential direction. As described below, the support portions 26-2 have a function that the armature 26 coaxially supports at the rotational center and are integrally rotated with the input axis by cooperating with the inner cylinder of the multi-plate friction clutch 30. The armature 26 includes the friction clutch driving portions 26-4 at the outer circumferential portion, as the integrated components.

The multi-plate friction clutch 30 is disposed in the housing 10, and includes an outer cylinder 32, driven plates 34 which are slidably disposed at a slide groove 32-1 of the outer cylinder 32, an inner cylinder 36, driving plates 38 which are slidably disposed at a slide groove 36-1 of the inner cylinder 36, clutch facings 40 which are fixed to both surfaces of the driven plates 34, and a pressure receiving plate 43 which is slidably disposed at the slide groove 32-1 of the outer cylinder 32 and is locked by a snap spring 42. The friction clutch driving portions 26-4 of the armature 26 are located at an opposite side of the pressure receiving plate 43. A clutch pack which includes the driven plates 34, the driving plates 38 and the clutch facings 40 is sandwiched between the friction clutch driving portions 26-4 and the pressure receiving plate 43. When the armature 26 moves in the axial direction, the engaging or the non-engaging of the multi-plate friction clutch 30 is performed by the friction clutch driving portions 26-4. In the outer cylinder 32, a wall portion 32-2 of the planetary gear mechanism 12 side is fixed to the pin 21 which is fixed to the carrier 16, and the outer cylinder 32 is integrally coupled to the carrier 16.

The inner cylinder 36 of the multi-plate friction clutch 30 is integrated with a holding disk 39 opposite to the armature 26, a central cylindrical portion 39-1 which is concentric to the rotational axis is formed in the inner circumference side of the holding disk 39, and the rotational axis to the electric motor side is spline-fitted to the spline groove 39-1a of the inner circumferential surface of the central cylindrical portion 39-1. The holding disk 39 has six openings 39-2 which introduce the armature and are formed with an equal interval to the circumferential direction near the outer circumference. The respective support portions 26-2 of the armature 26 are slidably fitted to these six openings 39-2, and the armature 26 is slidably supported by the clutch holding disk 39 to the axial direction.

The elastic body 44 such as a coil spring or a plate-shape spring is disposed between the armature 26 and the holding disk 39. In a case that the elastic body 44 is constituted by the coil springs, the coil springs which have the suitable number are disposed with an interval. The elastic body 44 urges the armature 26 to the left direction of the figures (FIG. 2) so that the clutch projection portions 26-1 are engaged with the clutch recess portions 18-2. The urging force of the elastic body 44 operates to release the engaging of the driving plates 38 against the driven plates (the multi-plate friction clutch 30 is not engaged).

Figure 9:
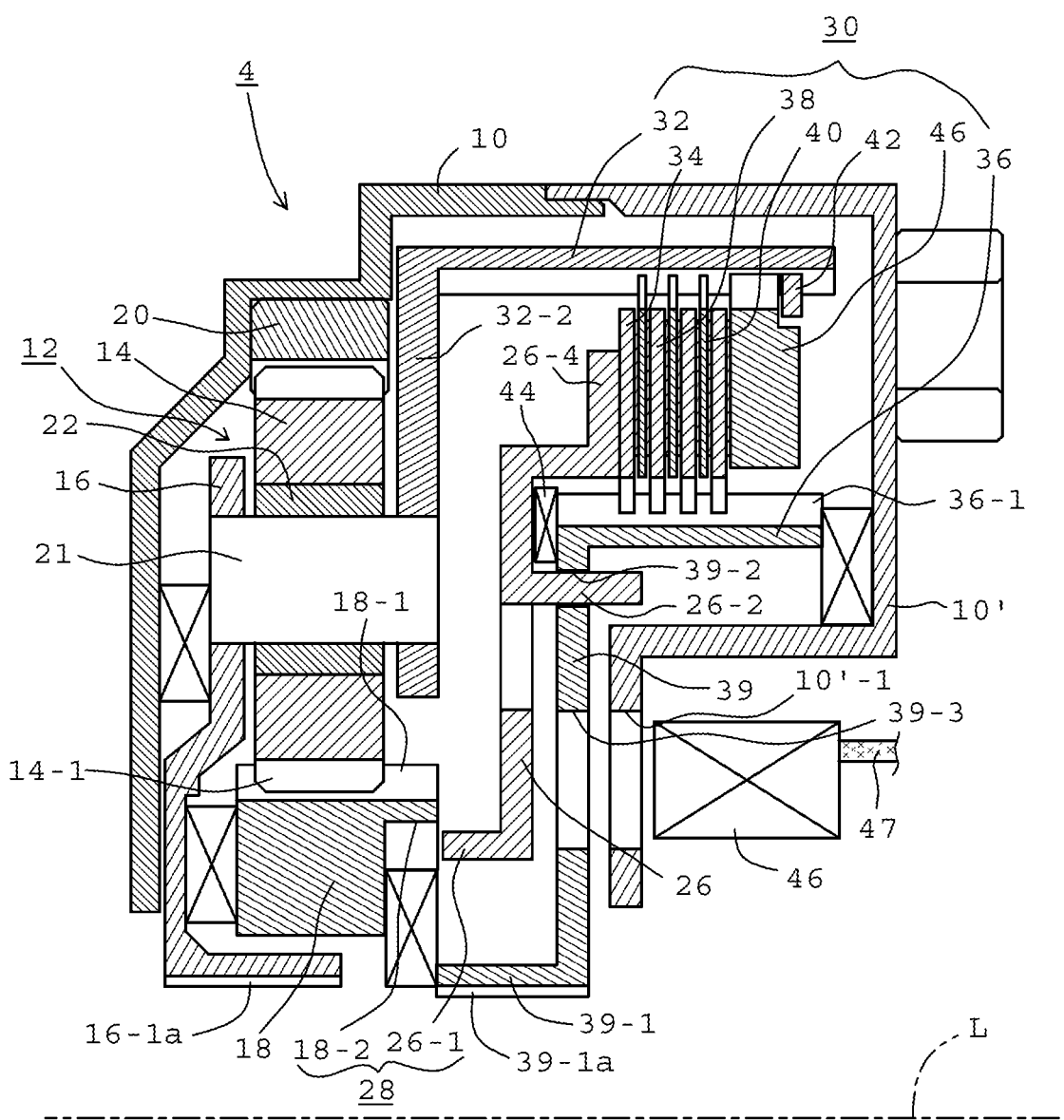
FIG. 9 shows the two-speed transmission apparatus of the first embodiment according to the present invention as well as FIG. 2, and shows a state that the dog clutch is not engaged and the friction clutch is engaged.
Figure 10:
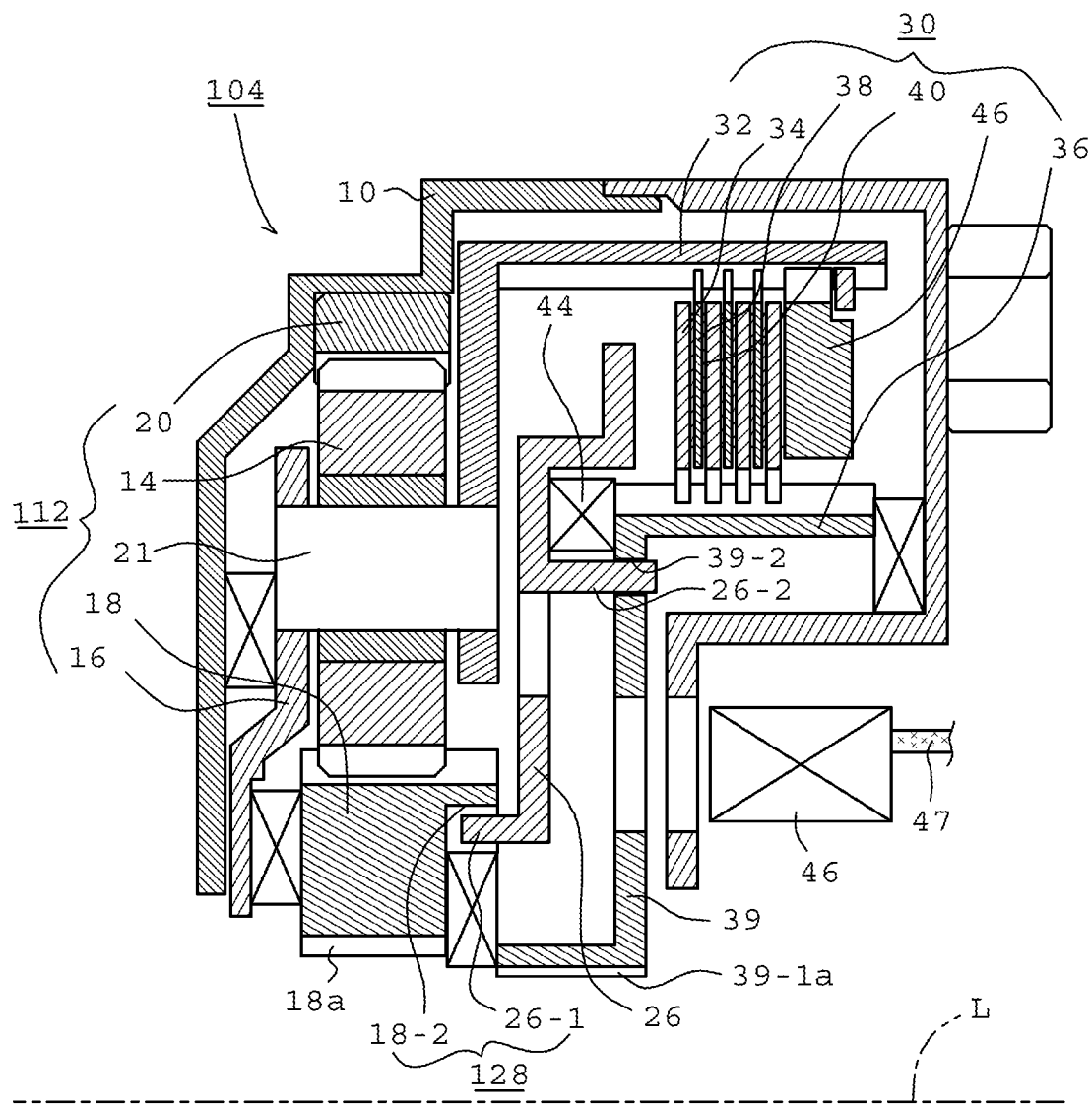
FIG. 10 is a cross-sectional view of an upper side portion along a central axis of the two-speed transmission apparatus of the second embodiment according to the present invention, and shows a state that the dog clutch is engaged and the friction clutch is not engaged.
Figure 11:
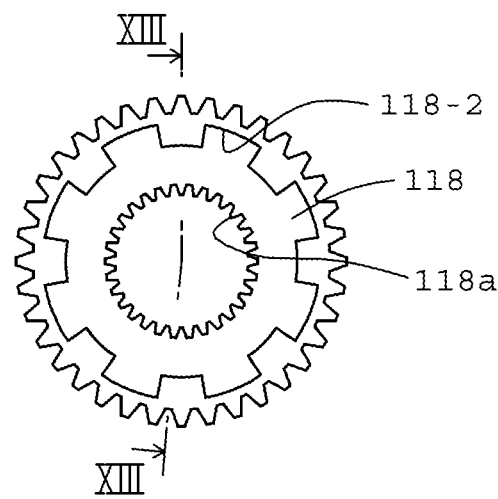
FIG. 11 is a front view of the sun gear of FIG. 10 viewed from the input axis side.
Figure 12:
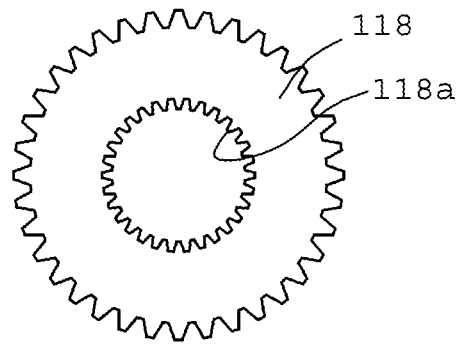
FIG. 12 is a back view of the sun gear of FIG. 11 viewed from the opposite side (the output axis side)
Figure 13:
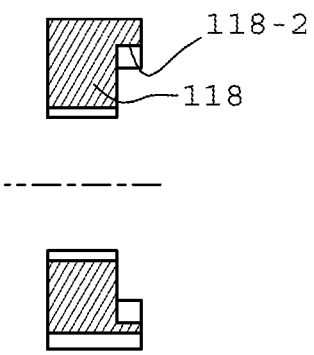
FIG. 13 is a back view of the sun gear taken along a XIII-XIII line of FIG. 11.

The electromagnetic coil 46 is disposed at an interior of the cover 10', and is opposite to the armature 26 via a magnetic flux forming holes 10-1' of the cover 10' on a magnetic flux path which are generated by the electrically energizing, and a magnetic flux forming holes 39-3 of the holding disk 39. Accordingly, the magnetic flux generated by the electrically energizing of the electromagnetic coil 46 releases the above engagement by the armature 26 against the elastic body 44 (the armature 26 moves to the right direction in FIG. 2). The support portions 26-2 of the armature 26 move to the right direction in FIG. 2 by the introducing of the openings 39-2 of the holding disk 39. The clutch projection portions 26-1 are released from the clutch recess portions 18-2, the dog clutch 28 is transited to the non-engaging state, and the multi-plate friction clutch 30 in which the driven plates 34 and the driving plates 38 are sandwiched between the friction clutch driving portions 26-4 and the pressure receiving plate 43 via the clutch facings 40 is transited to the engaging state. This state is shown in FIG. 9. The reference numeral 47 denotes a wire harness to electrically energize the electromagnetic coil 46. The bearings 52, 54 and 56 for thrust receiving are appropriately disposed.

The operation of the two-speed transmission 4 in the first embodiment will be described. In FIG. 2, the electromagnetic coil 46 is not electrically energized, and the dog clutch 28 is engaged and the multi-plate friction clutch 30 is not engaged by the elastic force of the elastic body 44. Since the ring gear 20 of the planetary gear mechanism 12 is constrained to the housing 10 which is fixed to the vehicle body, the rotational driving force (the rotation) from the electric motor for running is transmitted to the armature 26 by the holding disk 39 which is fitted to the electric motor side rotational axis at the spline groove 39-1a and the engagement portion which comprises the openings 39-2 and the support portions 26-2, and then is transmitted to the sun gear 18 of the planetary gear mechanism 12 by the engagement portion of the dog clutch 28 which comprises the clutch projection portions 26-1 and the clutch recess portions 18-2. Because the ring gear 20 of the planetary gear mechanism 12 is fixed to the housing 10 of the vehicle body side, the rotational driving force is transmitted to the carrier 16 to be reduced by the reduction ratio depending on the tooth number against the rotation of the sun gear 18. The output axis which is spline-fitted to the spline 26-1a is driven and is rotated by the rotation of the carrier 16. When the tooth number of the sun gear and the tooth number of the ring gear are set to "Zs" and "Zr", respectively, as is well known, the rotational ratio of the output axis (the carrier 16) to the input axis (the sun gear 18) is "Zs/(Zs+Zr)". That is, the rotational velocity of the output axis is reduced to the input axis, and the reduction ratio can be set to about "2.4". However, the reduction ratio is dependent on the tooth numbers of the sun gear and the ring gear.

When the electromagnetic coil 46 is electrically energized, the magnetic flux generated in the electromagnetic coil 46 moves the armature 26 to the right direction in FIG. 2 against the elastic force of the elastic body 44, and the armature 26 is moved to the position shown in FIG. 9. The clutch projection portions 26-1 of the dog clutch 28 are disengaged from the clutch recess portions 18-2 and the dog clutch 28 becomes the non-engaging state. The driven plates 34 and the driving plates 38 are sandwiched between the friction clutch driving portions 26-4 of the armature 26 and the pressure receiving plate 43 and the multi-plate friction clutch 30 becomes the engaging state. The rotation from the electric motor is transmitted to the outer cylinder 32 and the carrier 16 via the holding disk 39, the driving plates 38, the clutch facings 40 and the driven plates 34. That is, in this case, the output axis which is spline-fitted to the spline 16-1$a$ is driven and is rotated by the rotation of the carrier 16. Thus, the rotational velocity of the output axis is the same as that of the input axis.

In the first embodiment, the transmission 4 is driven with the first-speed reduction ratio (=2.4) during the low vehicle velocity driving of the vehicle. As explained in FIG. 1, if the reduction ratio of the reduction transmission 6 is set to "3.41", the total reduction ratio becomes "8.18" (=2.4×3.41) and is almost the same total reduction ratio of the conventional reduction mechanism. Therefore, the transmission 4 can obtain the high electric motor efficiency in the normal driving. Since the dog clutch 28 can obtain the engaging state by the elastic force of the elastic body 44 and the electromagnetic coil 46 is not electrically energized, the transmission can obtain the higher energy efficiency in the normal driving region. During the high vehicle velocity driving, the electromagnetic coil 46 is electrically energized, the dog clutch 28 becomes a non-engaging state, the multi-plate friction clutch 30 becomes a engaging state, and the transmission 4 is the two-speed reduction ratio (=1.0). Accordingly, the rotational velocity of the output axis is the same as that of the input axis, and the high efficient driving state of the electric motor can be ensured during the high vehicle velocity driving. That is, as explained in FIG. 1, the driving is performed by the total reduction ratio (the reduction ratio of the reduction mechanism 6) becomes "3.41" (=1.0×3.41). Since the total reduction ratio is reduced, the electric motor 2 can drive with the lower rotational velocity which is higher efficient rotation region than the prior art in the high vehicle velocity driving region.

In the first embodiment of FIG. 2, when the transmission is transited from the equal velocity (FIG. 9) to the reduced velocity (FIG. 2) and the electromagnetic coil 46 is not electrically energized, the elastic force of the elastic body 44 urges the armature 26 to the sun gear 18 side. In this moment, even when the clutch projection portions 26-1 of the armature 26 by which the dog clutch 28 is constituted are not aligned to the clutch recess portions 18-2, the relative rotation between the sun gear 18 whose rotational velocity is reduced and the armature 26 leads that the clutch recess portions 18-2 under urging the elastic force of the elastic body 44 are aligned to the clutch projection portions 26-1, the clutch projection portions 26-1 are fitted to the clutch recess portions 18-2 under the elastic force, and the dog clutch 28 becomes an engaging state, as shown in FIG. 2. This involves the shift shock to some extent. Since the transmission is the velocity reducing operation, no practical problem is existed.

FIGS. 10 to 13 show the two-speed transmission 104 of the second embodiment according to the present invention. The structure that the ring gear 20 is fixed to the housing 10 in the planetary gear mechanism 112 is the same as the first embodiment. The coupling to the output axis is changed from the carrier 16 to the sun gear 18. That is, the sun gear 18 comprises the tooth portions 18$a$, these tooth portions 18$a$ of the sun gear 18 mesh with the output axis (not shown) to the axle side (differential gear box side). The configuration of the dog clutch 128 which comprises the clutch engagement portions 26-1 of the armature 26 of the sun gear 18 and the clutch recess portions 18-2 of the sun gear 18 is the same as that of the dog clutch 28 of the first embodiment. Other portions are the same as those of the first embodiment in FIG. 2. The same components are given the same reference numerals, and the explanation is omitted.

Explaining the operation of the transmission 104 in the second embodiment, when the electromagnetic coil 46 is not electrically energized, the dog clutch 128 is engaged by the elastic force of the elastic body 44 and the multi-plate friction clutch 30 is not engaged. The rotation from the electric motor for running is transmitted to the armature 26 by the holding disk 39 which is fitted to the electric side rotational axis (not shown) at the spline 39-1$a$ and the engagement portion which comprises the openings 39-2 and the support portions 26-2, and then is transmitted to the sun gear 18 of the planetary gear mechanism 112 by the engagement portion of the dog clutch 128 which comprises the clutch engagement portions 26-1 and the clutch recess portions 18-2. The tooth portions 18$a$ in an inner circumference of the sun gear 18 are fitted to the output axis (not shown). Therefore, the rotation of the input axis is transmitted to that of the output axis with a one-to-one relationship. In this time, the transmission ratio becomes "1.0". The rotational velocity of the carrier 16 is the same as that of the input axis.

When the electromagnetic coil 46 is electrically energized, under the electromagnetic force, the clutch projection portions 26-1 of the dog clutch 128 are disengaged from the clutch recess portions 18-2 against the elastic force and the dog clutch 128 becomes the non-engaging state. The clutch 30 becomes the engaging state as well as the first embodiment. The rotation from the electric motor is transmitted to the outer cylinder 32 and the carrier 16 via the holding disk 39, the driving plates 38, the clutch facings 40 and the driven plates 34. The sun gear 18 is driven and is rotated by the rotation of the carrier 16 and then the output axis which is fitted to the tooth portions 18$a$ is driven and is rotated. That is, in this case, the rotational number of the output axis is higher than that of the input axis. When the tooth number of the sun gear and the tooth number of the ring gear are set to "Zs" and "Zr", respectively, as is well known, the increasing ratio of the transmission is "(Zs+Zr)/Zs".

In the second embodiment, the rotation of the input axis is transmitted to that of the output axis with a one-to-one relationship during the low vehicle velocity driving of the vehicle. When the electromagnetic coil 46 is electrically energized during the high vehicle velocity driving of the vehicle, the rotational ratio of the output axis to the input axis is increasing. The rotational number of the output axis in the low vehicle velocity driving of the vehicle is lower than that in the high vehicle velocity driving of the vehicle to the same rotational number of the input axis. Comparing with the first embodiment during the low vehicle velocity driving, since there is a one-to-one relationship between the input and the output and the rotational ratio of the input axis to the output axis is not reduced (the reduction ratio=2.4), the rotational number of the output side to the same input rotational number is higher. By setting the reduction ratio of the reduction mechanism 6 to the larger value than that of the first embodiment (the output side gear diameter of the reduction mechanism 6 is larger), the total reduction ratio can be set to about "8.18" which is the expected value of the first embodiment, and as well as the first embodiment, the high rotational number of the vehicle driving electric motor can be used during the low vehicle velocity driving which is in the normal driving region. Because the dog clutch is engaged by utilizing the elastic body 44 during the low vehicle velocity driving and the electromagnetic coil 46 is not electrically energized, the effect that the higher energy efficiency is realized in the normal driving region can be obtained as well as the first embodiment.

In the high vehicle velocity driving, the transmission 104 is velocity-increasing (the increasing ratio is "2.4"). Since the reduction ratio of the reduction mechanism 6 is larger, the total reduction ratio is similar to the first embodiment (the provisional value is "3.41"), the high vehicle velocity driving can be performed in the low rotational velocity region of the electric motor 2, and the efficiency of the electric motor in the high vehicle velocity driving can be improved.

Figure 14:
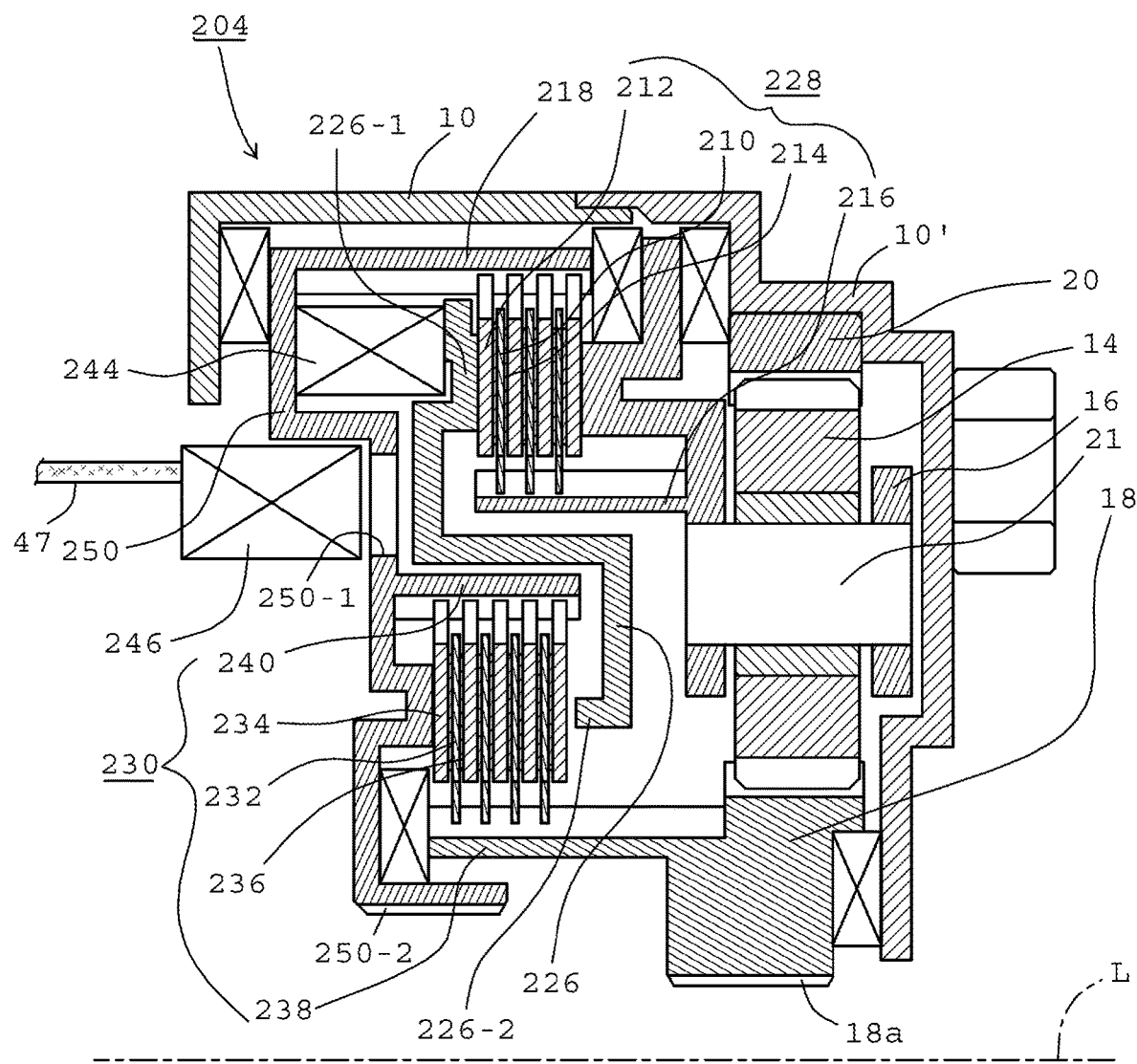
FIG. 14 is a cross-sectional view of an upper side portion along a central axis of the two-speed transmission apparatus of the third embodiment according to the present invention.

FIG. 14 shows the two-speed transmission 204 of the still another embodiment (the third embodiment) according to the present invention. In this embodiment, both the first-speed clutch 228 and the second-speed clutch 230 are the multi-plate friction clutch. The planetary gear mechanism 20 comprises three rotational components including a carrier 16 to rotatably support plural pinions 14 disposed at a circumferential direction with an interval, a sun gear whose rotational center is common to the carrier 16 and which meshes with the pinions 14, and a ring gear 20 whose rotational center is common to the carrier 16 and which meshes with the pinions 14. Pins 21 for supporting the respective pinions 14 to the carrier 16 are disposed (the pins 21 are fixed to the carrier 16). The configuration that the ring gear 20 is fixed to the case side in the outer circumference (the cover 10' in this case) is the same as the other embodiments. However, the configurations that the planetary gear mechanism 20 is disposed at an input side of the case and inner teeth of the sun gears 18 are spline-fitted to the input axis are different.

The first-speed multi-plate friction clutch 228 comprises the driving plates 210, the driven plates 212, the clutch facings 214 fixed to the both surfaces of the driving plates 210, the inner side clutch drum 216 slidably holding the driving plates 210 and the outer side clutch drum 218 slidably holding the driven plates 212, and the inner side clutch drum 216 is integrally coupled to the pins 21 which is fixed to the carrier 16. The elastic body 244 which urges the first-speed multi-plate friction clutch 228 to the engaging direction via the clutch driving portions 226-1 of the clutch driving plates 226.

The second-speed multi-plate friction clutch 230 comprises the driving plates 232, the driven plates 234, the clutch facings 236 fixed to the both to the both surfaces of the driving plates 232, the inner side clutch drum 238 slidably holding the driving plates 232 and the outer side clutch drum 240 slidably holding the driven plates 234, and the inner side clutch drum 238 is integrally rotated with and is coupled to the sun gear 18. The elastic body 244 is oppositely disposed to the clutch driving portions 226-2 of the clutch driving plates 226. Ina normal state, the clutch driving portions 226-2 are separately positioned by the elastic body 244 and the second-speed multi-plate friction clutch 230 positions the non-engaging state. The electromagnetic coil 246 is oppositely disposed to the clutch driving plates 226 via the magnetic flux forming holes 250-1 formed on the output plate 250 which integrally rotates the outer side clutch drum 218. The output plate 250 comprises the spline portions 250-2 for fitting to the output axis in the inner circumference.

In the operation of the transmission for the electric vehicle according to the third embodiment, when the first-speed gear is operated, the electromagnetic coil 246 is not electrically energized, the first friction clutch 228 is engaged by the elastic force of the elastic body 244, and the second friction clutch 230 is not engaged. The rotation of the input axis is transmitted to the output axis via the sun gear 18, the pinions 14, the carrier 16, the first friction clutch 228 and the output plate 250. In this case, the rotational number of the output axis to that of the input axis is reduced. As well as the first embodiment, when the tooth number of the sun gear and the tooth number of the ring gear are set to "Zs" and "Zr", respectively, the reduction ratio is "Zs/(Zs+Zr)".

When the second-speed gear is operated, the electromagnetic coil 246 is electrically energized, the electromagnetic force generated in the electromagnetic coil 246 moves the armature 226 to the left direction in FIG. 14 against the elastic force of the elastic body 244, the clutch driving portions 226-1 are separately positioned from the clutch plate 212, and the first clutch 228 is not be engaged. The electromagnetic force generated in the electromagnetic coil 246 operates to the clutch driving portions 226-2 against the elastic force of the elastic body 244 so as to engage with the second clutch 230. In this case, the rotation of the input axis is directly transmitted to the output axis via the second clutch 230, and the rotational ratio becomes "1.0".

In the third embodiment, the rotation of the output axis to that of the input axis is reduced during the low vehicle velocity driving of the vehicle. Thus, the high rotational number of the vehicle driving electric motor can be used during the low vehicle velocity driving, and the high electric motor efficiency can be obtained in the normal driving. Because the engaging state can be obtained by the elastic force of the elastic body 244 and the electromagnetic coil 46 is not electrically energized, the energy efficiency in the normal driving region can be improved. During the high vehicle velocity driving, the electromagnetic coil 46 is electrically energized, the rotational velocity of the output axis is the same as that of the input axis, the transmission ratio of the transmission 204 increases, and the high vehicle velocity driving can be performed even when the rotational velocity of the electric motor 2 is reduced. Thus, the operation as well as the first embodiment that the high velocity running can achieved in a state that the electric motor 2 is high efficiency is realized.

In the embodiments of the present invention (for example, the first embodiment shown in FIGS. 1 to 9), in a case that the two-speed transmission is performed by switching between the operation of the dog clutch 28 and the operation of the friction clutch 30 using the linear movement of the armature 26 which is driven by the electromagnetic force, it is required that the situation that the two clutches are simultaneously the engagement state has to be avoided. Ideally, it is not impossible that the situation that one of the two clutches is engaged and the other is not engaged is simultaneously occurred. However, considering the component tolerance, when switching from the first-speed gear (FIG. 2) to the second-speed gear (FIG. 9) or switching from the second-speed gear to the first-speed gear, it is necessary that the intermediate state that the two clutches become the non-engaging state is provided. Although the intermediate state that both two clutches become the non-engaging state is continued for extremely short time, the torque interruption that the rotation of the electric motor rotational axis of the driving side is not transmitted to the wheels which are a driven side, and the driver feels the shift shock. In the following embodiments, the configuration that uses the one-way clutch is adopted so as to resolve the above problem.

Figure 15:
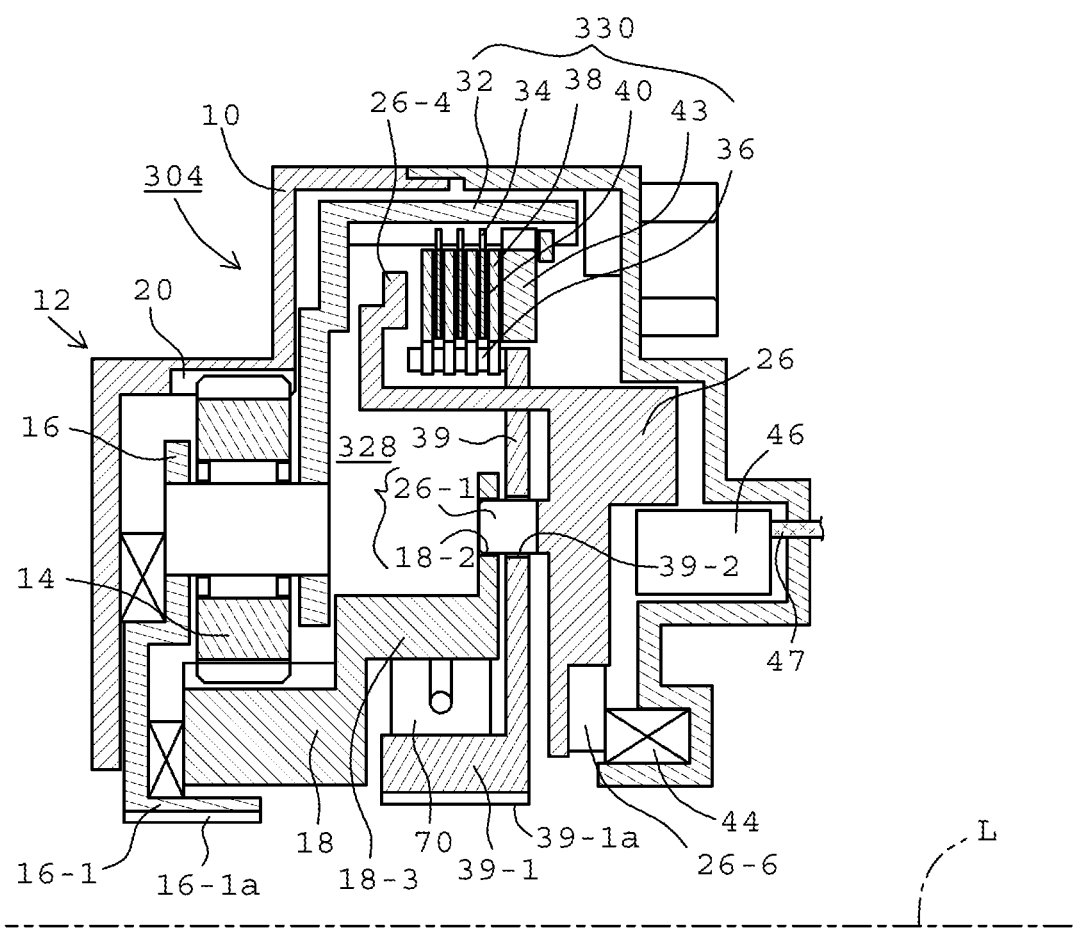
FIG. 15 is a cross-sectional view of an upper side portion along a central axis of the two-speed transmission apparatus of the fourth embodiment according to the present invention, and shows a state that the dog clutch is engaged and the friction clutch is not engaged.
Figure 16:
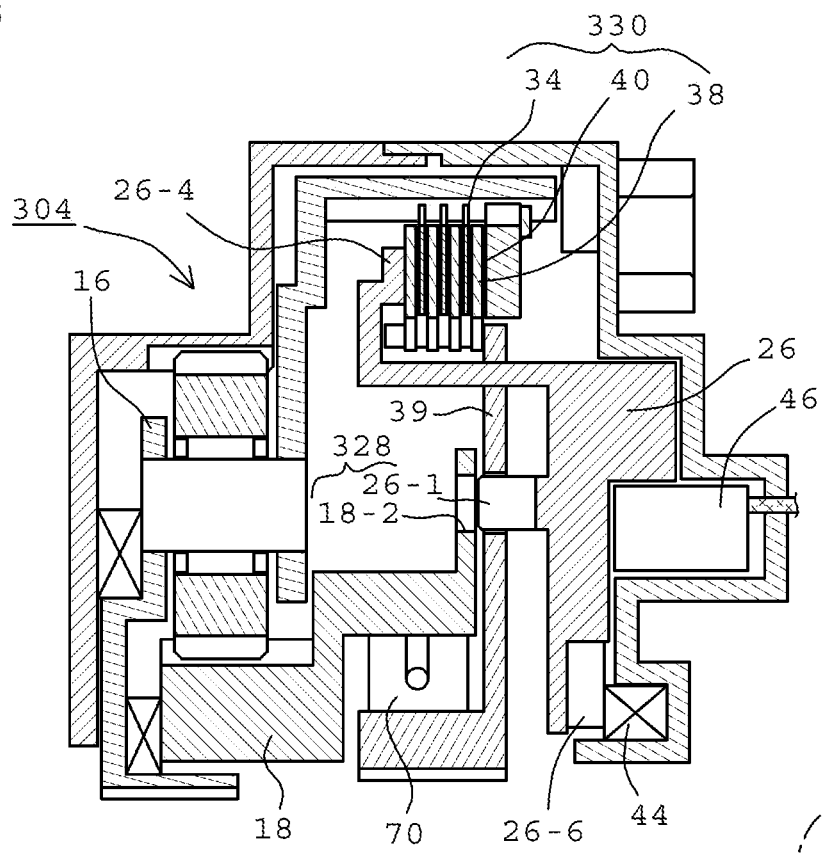
FIG. 16 shows the two-speed transmission apparatus of the fourth embodiment according to the present invention as well as FIG. 15, and shows a state that the dog clutch is not engaged and the friction clutch is engaged.

FIGS. 15 and 16 show the two-speed transmission 304 of the fourth embodiment according to the present invention. The switching method between the low vehicle velocity driving and the high vehicle velocity driving by the transmission is basically the same as that of the two-speed transmission 4 of the first embodiment. The two-speed transmission 304 comprises the dog clutch 328 and the multi-plate friction clutch 330. The dog clutch 328 which is integrated with the armature 26 comprises the engagement portions 26-1 which insert into the openings 39-2 of the holding disk 39, and the engagement holes 18-2 which are formed to the integrally extending portion of the sun gear 18. The multi-plate friction clutch 330 is disposed between the driving portions 26-4 integrated with the armature 26 and the pressure receiving plate 43 engaged with the outer cylinder 32, and comprises a clutch pack including the driven plates 34 which slidably move on the outer cylinder 32 which is integrated with the carrier 16, the driving plates 38 which slidably move on the inner cylinder 36 which is integrated with the holding plate 39, and the clutch facings 40 which are fixed to both surfaces of the driven plates 34. In the fourth embodiment, as the countermeasure of the torque interruption when switching from the first-speed gear to the second-speed gear or switching from the second-speed gear to the first-speed gear by the above linear movement of the armature 26, the one-way clutch 70 is fitted between the cylindrical portion 18-3 integrated with the sun gear 18 and the cylindrical portion 39-1 of the holding disk 39 (the holding disk 39 is fitted to the electric motor rotational axis at the spline 39-1 as well as the first embodiment).

Figure 17:
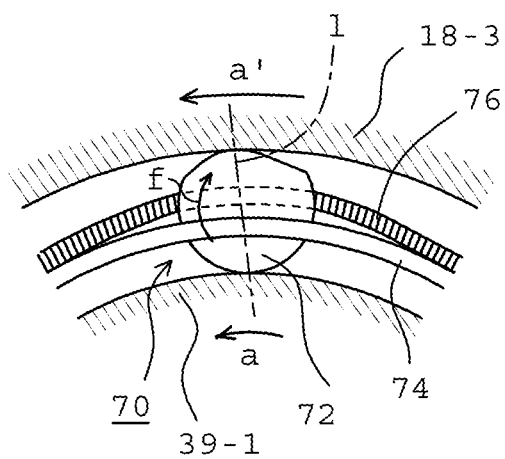
FIG. 17 is a schematic view showing a one-way clutch for preventing torque interruption in the two-speed transmission apparatus of the fourth embodiment.

In the fourth embodiment, FIG. 17 is a schematic view showing the known cam type one-way clutch 70. In particular, this one-way clutch is schematically depicted with reference to the FEW-BRB type one-way clutch manufactured in NSK Ltd. from the catalog of NSK Ltd. (https://www.jp.nsk.com/app01/jp/ctrg/index.cgi?gr=dn & pno=4601a). It is not intended to limit the cam type one-way clutch, and other suitable methods such as a suplug type and a roller type can be adopted. In the cam type one-way clutch 70 of the fourth embodiment shown in FIG. 17, in principle, an inner race and an outer race are depicted as the cylindrical portion 39-1 of the holding disk 39 and the cylindrical portion 18-3 integrated with the sun gear 18. As is well known, the one-way clutch comprises a unit including the inner race and the outer race. In the present invention, the detail configuration of the one-way clutch 70 is not directly referred to the main object of the present invention. For simplifying the explanation, the principal configuration of the one-way clutch is depicted in FIG. 17. In the cam type one-way clutch 70, the plural cams 72 (only one cam is depicted in FIG. 17) with an interval in the circumferential direction are held in a holding annulus 74. The cams 72 are rotationally urged under the elastic force by an endless garter spring 76 which is formed on the cams 72 and is inserted into the groove which is opened to the radial outward. In the rotation to the clockwise direction f, the cams 72 serves as the projection between the inner race (the cylindrical portion 39-1) and the outer race (the cylindrical portion 18-3), and is abutted to the opposite surfaces in the inner and outer circumferences along the line "1" (the cams 72 are the locking state). In the counterclockwise direction, the cams 72 have the shape that the projection is released. In FIG. 17, the barycenter of the cams 72 is slightly deviated to the rightward from the line "1", and then the spring force of the garter spring 76 urges the cams 72 so that the cams 72 rotate in the clockwise direction and become the locking state.

The operation of the transmission 304 of the fourth embodiment will be described. When the low vehicle velocity driving, as shown in FIG. 15, the sun gear 18, the armature 26 and the holding disk 39 are integrally rotated by engaging the dog clutch 328, and the one-way clutch 70 which is positioned between the central cylinder portion 39-1 of the holding disk 39 and the cylinder portion 18-3 of the sun gear 18 integrally rotates with the same velocity. In this case, it is the same that the one-way clutch 70 does not exist.

In order to switch from the low vehicle velocity driving to the high vehicle velocity driving, under the electromagnetic force of the electromagnetic coil 46, the spring pressing portion 26-6 presses the spring 44, the armature 26 moves to the right direction in FIG. 15 by the deformation of the spring 44, the engagement portions 26-1 are removed from the engagement holes 18-2, and the dog clutch 328 becomes the non-engaging state. Just after the dog clutch 328 is not engaged, the intermediate state that the friction clutch 330 is not engaged is instantaneously existed. In this moment, in a case of the first embodiment of FIG. 2, since the sun gear 18 is released from the driving source (the electric motor rotational axis), the driving torque is lost and the shift shock can be occurred. In contrast, in a case of the fourth embodiment of FIG. 15, when the dog clutch 328 becomes the non-engaging state, as shown in FIG. 17, the cams 72 receive the projection direction force (the clockwise direction force) to the rotation of the arrow "a" direction of the electric motor rotational axis (to the rotation of the central cylindrical portion 39-1 of the holding disk (the inner race of the one-way clutch)), the cylindrical portion 18-3 of the sun gear 18 (the outer race of the one-way clutch) is locked, the rotation of the arrow "a" direction of the electric motor rotational axis (the rotation whose direction is the same as that of the rotation of the central cylindrical portion 39-1 of the holding disk 39 (the inner race of the one-way clutch)) is transmitted to the sun gear 18, that is, the wheel side, and the torque interruption is not occurred. The armature 26 continues the right direction movement in FIG. 15, and the friction clutch 330 becomes the engaging state shown in FIG. 16 (the state is transited to the high vehicle velocity driving). After being transited to the high vehicle velocity driving, the rotational number of the electric motor output axis increases. When the rotational number of the sun gear 18, that is, the rotational number of the rotation to the arrow a' of the cylindrical portion 18-3 of the sun gear 18 shown in FIG. 17 is higher than that of the rotation to the arrow "a" direction of the electric motor rotational axis (the rotational number of the central cylindrical portion 39-1 of the holding disk 39), the cams 72 rotate to the counterclockwise direction against the spring force of the garter spring 76, the projection function of the cams 72 is lost, and the locking of the one-way clutch 70 is released. In other words, the one-way clutch 70 freely rotates.

When the electromagnetic coil 46 is not electrically energized, the armature 26 moves from a state of FIG. 16 to a state of FIG. 15 in the left direction under the elastic force of the spring 44. Even in the process that the operation of the electric motor switches from the high vehicle velocity driving to the low vehicle velocity driving, a situation that both the friction clutch 330 and the dog clutch 328 are the non-engaging state can instantaneously be occurred. In this moment, when the rotational number of the sun gear 18 of the wheel side (the cylindrical portion 18-3 of the sun gear 18) becomes lower than that of the electric motor rotational axis (shown by the arrow "a"), in the one-way clutch 70 of FIG. 17, the cams 72 are rotationally urged under the spring force in the projection direction (shown by the arrow "f"), the cylindrical portion 18-3 of the sun gear 18 is locked to the central cylindrical portion 39-1 of the holding disk 39 of the electric motor rotational axis side, and the rotation of the electric motor is transmitted to the wheel side via the one-way clutch 70. Even in this case, the one-way clutch 70 functions so as to prevent the torque interruption when switching the clutch. When the dog clutch 328 is completely the engaging state, the one-way clutch 70, which is positioned between the central cylindrical portion 39-1 of the holding disk 39 and the cylindrical portion 18-3 of the sun gear 18, integrally rotates with the same rotational velocity. The transmission is transited to the first-speed gear and the one-way clutch 70 integrally rotates with the same rotational velocity.

Figure 18:
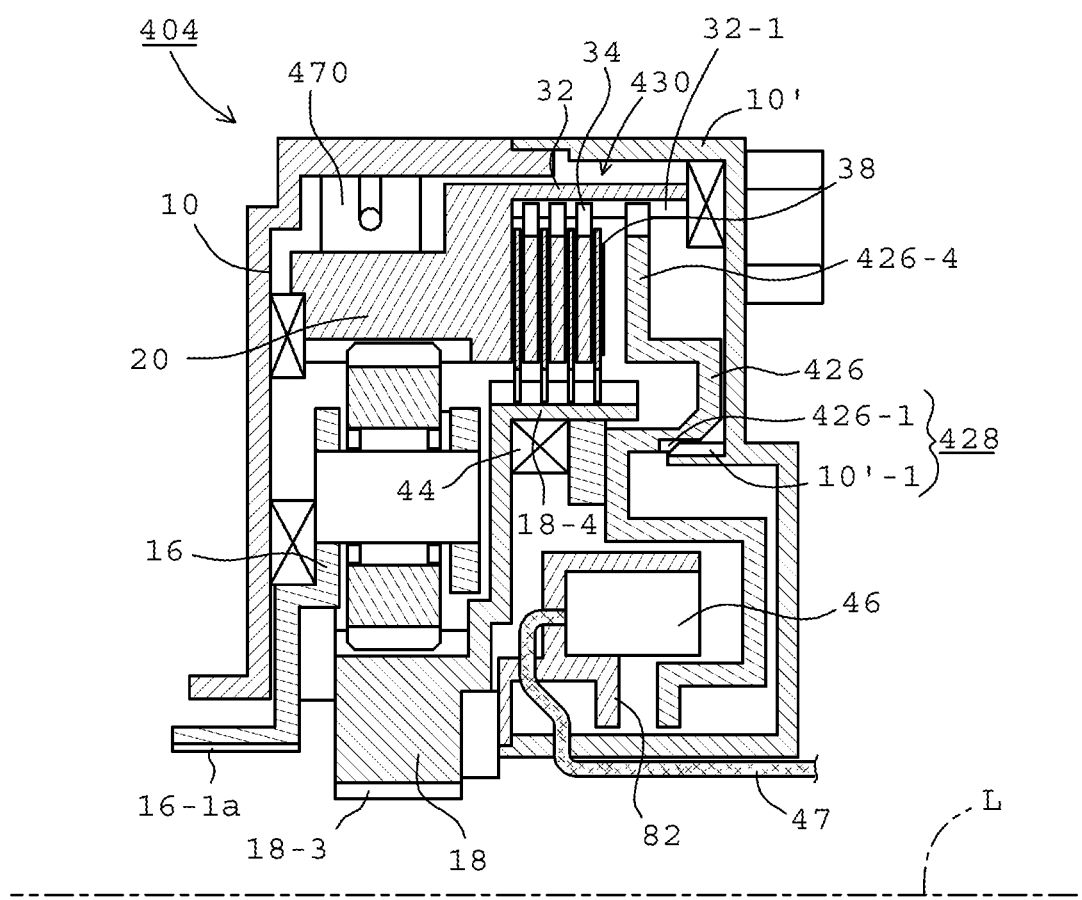
FIG. 18 is a cross-sectional view of an upper side portion along a central axis of the two-speed transmission apparatus of the fifth embodiment according to the present invention, and shows a state that the dog clutch is engaged and the friction clutch is not engaged.
Figure 19:
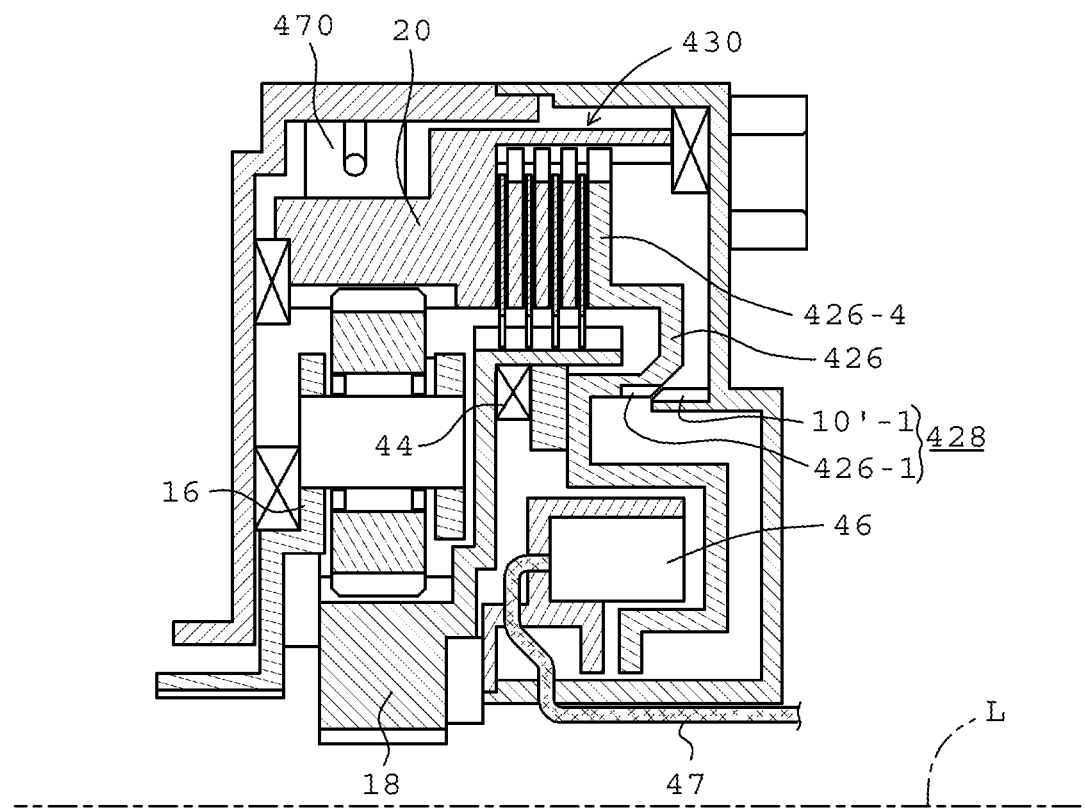
FIG. 19 shows the two-speed transmission apparatus of the fifth embodiment according to the present invention as well as FIG. 18, and shows a state that the dog clutch is not engaged and the friction clutch is engaged.

FIGS. 18 and 19 show the two-speed transmission 404 of the fifth embodiment according to the present invention that the countermeasure in switching between the low vehicle velocity driving and the high vehicle velocity driving is taken. In the two-speed transmission 404 of the fifth embodiment, the reduced velocity driving that the ring gear 20 is fixed and the gear ratio is "2.4" is performed in the low vehicle velocity driving, and the equal velocity driving that the sun gear 18 integrally rotates with the ring gear 20 and the gear ratio is "1.0" is performed in the high vehicle velocity driving. The above driving method is the same as the first embodiment shown in FIGS. 2 to 9, the third embodiment shown in FIG. 14, and the fourth embodiment shown in FIGS. 15 and 16. The fifth embodiment has a feature that the one-way clutch 470 for performing the selective constrain against the housing 10 of the ring gear 20 is provided.

The configuration of the two-speed transmission 404 of the fifth embodiment will be described. The armature 426 comprises the inner teeth 426-1 in the circumferential direction, and the outer teeth 10'-1 in the circumferential direction are formed on the cover 10' fixed to the housing 10. The dog clutch 428 is constituted by the inner teeth 426-1 and the outer teeth 10'-1. The outer circumferential portion 426-4 of the armature 426 is configured to the driving portion of the clutch 430. The outer circumferential portion 426-4 of the armature 426 is slidably engaged with the slide groove 32-1 of the driven disks 34 in the outer cylinder 32 of the friction clutch 430. In order to attach the electromagnetic coil 46, the electromagnet holding frame 82 made of a non-magnetic material is fixed to the cover 10'. In the fifth embodiment, the inner circumferential spline 18-3 of the sun gear 18 is spline-fitted to the electric motor rotational axis, and then the electric motor rotational driving force is transmitted to the sun gear 18. The back end cylindrical portion 18-4 of the sun gear 18 becomes the inner cylinder of the friction clutch 430 in the fifth embodiment, and the driving plates 38 are provided. The carrier 16 is spline-fitted to the output axis of the wheel side via the inner spline 16-1a, and this configuration is the same as that of the first embodiment.

Figure 20:
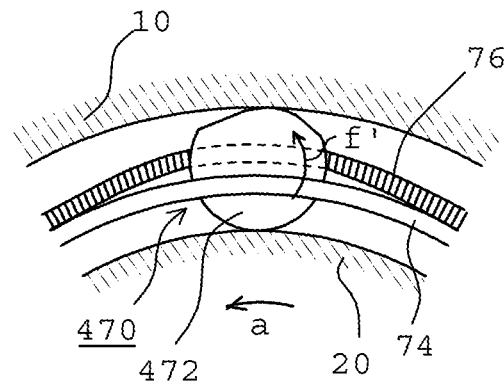
FIG. 20 is a schematic view showing a one-way clutch for preventing torque interruption in the two-speed transmission apparatus of the fifth embodiment.

In the fifth embodiment, the one-way clutch 470 for preventing the torque interruption when the velocity-switching between the first-speed gear and the second-speed gear is disposed between the ring gear (which functions as the inner race of the one-way clutch 470 in the schematic view of FIG. 20) and the housing 10 (which functions as the outer race of the one-way clutch 470 in the schematic view of FIG. 20). As shown in FIG. 20, the direction of the cams 472 of the one-way clutch 470 is opposite to that of the cams 47 of the one-way clutch 70 in the fourth embodiment. The projection between the inner race (the ring gear 20) and the outer race (the housing 10) is operated by the counterclockwise rotation f' of the cams 472 under the spring force.

The operation of the fifth embodiment will be described. During the low vehicle velocity driving, the electromagnetic coil 46 is not electrically energized. In FIG. 18, the armature 426 is pressed to the abutment position to the cover 10' by the spring 44, the inner teeth 426-1 of the armature 426 meshes with the outer teeth 10'-1 of the cover 10', the dog clutch 428 becomes the engaging state (the friction clutch 430 becomes the non-engaging state), the armature 426 is fixed, and the ring gear 20 is fixed to the cover 10', that is, the housing 10 by engaging the outer circumferential portion 426-4 of the armature 426 with the slide groove 32-1 in the outer cylinder 32 of the friction clutch 430. Thus, the rotation of the electric motor rotational axis meshing with the sun gear 18 is transmitted to the carrier 16. In this time, the transmission ratio is "2.4" as well as the first embodiment, the output rotational velocity is reduced, and the one-way clutch 470 is fixed at both the inner race side and the outer race side. Considering the functional aspect, this is the same situation that the one-way clutch 470 is not disposed.

When switching from the low vehicle velocity driving (FIG. 18) to the high vehicle velocity driving (FIG. 19), a situation that the dog clutch 428 is the non-engaging state and the friction clutch 430 is not completely engaged can be occurred. In this moment, the ring gear 20 instantaneously becomes a free state and returns the direction (the direction in which the torque interruption is occurred) which is opposite to the rotational direction "a" of the rotational axis of the electric motor. The cams 472 of the one-way clutch 470 functions so that such a movement is locked. Namely, the cams 472 continue the locking against the housing 10 of the ring gear 20 and function so that the rotation of the rotational axis of the electric motor is transmitted to the wheel side via the sun gear 18 and the carrier 16, and then the torque interruption is prevented. When the friction clutch 430 completely becomes an engaging state, the rotation of the ring gear 20 which is the same direction as the rotational direction (shown by the arrow "a") of the electric motor rotational axis is transmitted to the wheel side with the transmission ratio whose value is "1.0". In this time, the one-way clutch 470 is idle.

When switching from the high vehicle velocity driving (FIG. 19) to the low vehicle velocity driving (FIG. 18), since the friction clutch 430 is a non-engaging state and the dog clutch 428 is not transited to an engaging state, the torque interruption state that the constrain is not instantaneously released can be occurred. Even in this moment, since the one-way clutch 470 functions as the projection and the ring gear 20 is locked, the rotation of the electric motor of the input side can be transmitted to the wheels of the output side until the dog clutch 428 becomes an engaging state. When the dog clutch 428 completely becomes an engaging state, the ring gear 20 is integrated with the housing 10 and the rotation of the electric motor rotational axis is transmitted to the carrier 16 with the reduction ratio whose gear ratio is "2.4". This is the same situation that the one-way clutch 470 is not disposed.

In the first to fifth embodiments, the switching between the first-speed gear and the second-speed gear is performed by fixing the ring gear. Considering the planetary gear mechanism, even in a case of fixing the sun gear, the gear ratio can be changed while the rotational direction of the input side is the same as that of the output side. In a case of fixing the carrier, the rotational direction of the input side is opposite to that of the output side. Thus, fixing the carrier is not appropriate in the two-speed transmission of the electric vehicle. The following sixth embodiment is an application example that the sun gear fixing method is adapted to the present invention, and this example also has a function to prevent the torque interruption by the one-way clutch.

Figure 21:
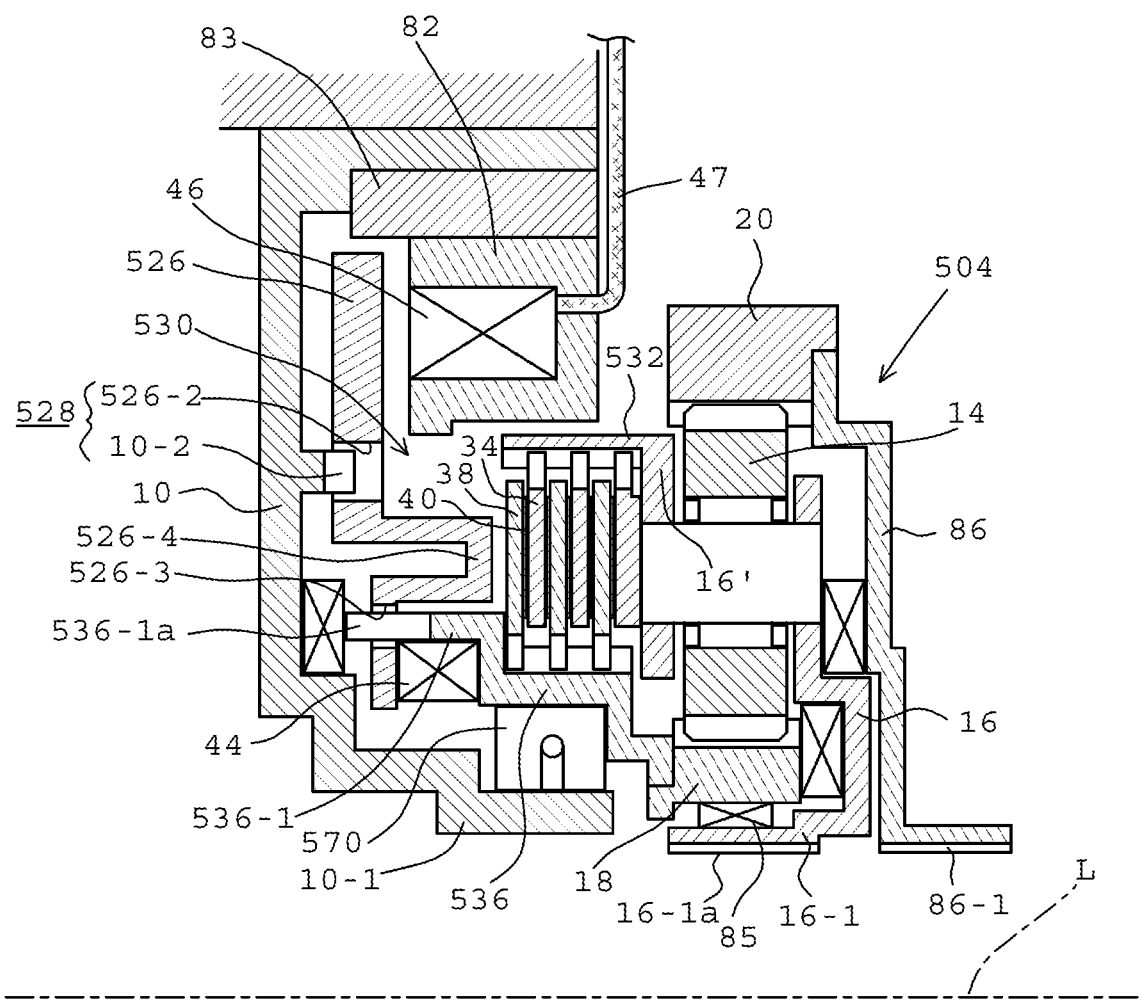
FIG. 21 is a cross-sectional view of an upper side portion along a central axis of the two-speed transmission apparatus of the sixth embodiment according to the present invention, and shows a state that the dog clutch is engaged and the friction clutch is not engaged.
Figure 23:
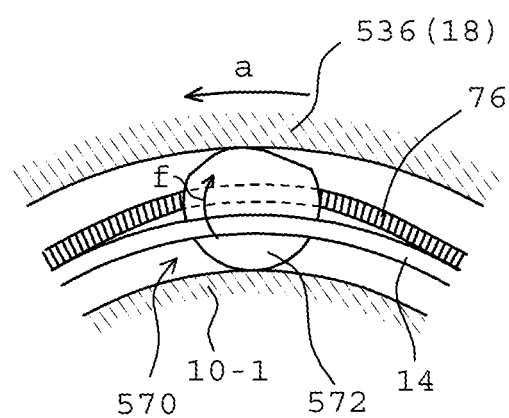
FIG. 23 is a schematic view showing a one-way clutch for preventing torque interruption in the two-speed transmission apparatus of the sixth embodiment.

FIG. 21 shows the two-speed transmission 504 of the sixth embodiment. In the two-speed transmission 504 of the sixth embodiment, the sun gear 18 of the planetary gear mechanism is extended to backward, and is integrally coupled to the inner cylinder 536 of the friction clutch 530. The one-way clutch 570 is disposed between the inner cylinder 536 of the friction clutch 530 and the cylindrical portion 10-1 of the housing 10. In the sixth embodiment, the input is from the ring gear and the output is to the carrier. That is, the coupling material 86 is fixed to the ring gear 20 in the front end side, the inner circumferential spline 86-1 of the coupling material 86 is coupled to the electric motor rotational axis (the input axis) (not shown) by spline-fitting, and the spline 16-1a of the inner side cylindrical portion 16-1 in the carrier 16 of the planetary gear mechanism is coupled to the wheel side output axis (not shown) by spline-fitting. The outer cylinder 532 of the friction clutch 530 is formed at the back end side (16'). The inner side cylindrical portion 16-1 of the carrier 16 has a structure that the sun gear 18 is rotatably supported by the bearing 85. The friction clutch 530 comprises the clutch pack, and the clutch pack includes the driven plates 34, the driving plates 38 and the clutch facings 40. The configuration of the clutch pack is the same as those of the first to fifth embodiments. In the sixth embodiment, the armature 526 is slidably supported in the axial direction by inserting the comb-shape projection portion 536-1a in the end portion of the cylindrical extending portion 536-1 extending to the backward of the inner cylinder 536 into the support hole 526-3 which is separately disposed in the circumferential direction of the inner circumferential portion of the armature 526. The dog clutch 528 of the sixth embodiment comprises the engagement hole 526-2 of the armature 526 and the engagement projection 10-2 of the housing 10. The electromagnetic coil 46 is held by the holding frame 82, and the holding frame 82 is supported to the housing 10 by the non-magnetic material 83. In the sixth embodiment, the casing which covers the overall transmission comprises the housing 10 and the cover, and the illustration of the cover is omitted. The one-way clutch 570 of the sixth embodiment can schematically be shown in FIG. 23. The cams 572 are disposed between the cylindrical portion 10-1 of the housing 10 of the inner race side and the inner cylinder 536 (the sun gear 18) of the friction clutch 530 of the outer race side. The cams 572 are urged by the garter spring 76 so as to become the projection between the inner race and the outer race by the rotation in a clockwise direction as well as FIG. 17. The rotational direction of the electric motor rotational axis is a counter-clockwise direction shown by the arrow "a", as well as the first to fifth embodiments.

The operation of the two-speed transmission 504 of the sixth embodiment will be described. During the low vehicle velocity driving, the electromagnetic coil 46 is not electrically energized. As shown in FIG. 21, the armature 526 is driven to the leftward by the spring 44, the dog clutch 528 becomes an engaging state that the engagement hole 526-2 of the armature 526 is engaged to the engagement projection 10-2 of the housing 10, and the armature 26 becomes a fixed state. Thus, since the comb-shape projection portion 536-1a in the cylindrical extending portion 536-1 which is integrated with the sun gear 18 is inserted into the support hole 526-3 of the armature 526, the sun gear 18 is also fixed to the housing side. Because the friction clutch 530 is a non-engaging state that the driving portion 526-4 is separately positioned from the friction plate, the rotation of the electric motor rotational axis which is inputted from the coupling material 86 to the ring gear 20 is transmitted to the carrier 16 via the pinions 14 as the same direction rotation, and the rotation of the carrier 16 is transmitted to the wheel side output axis (not shown) which is meshed with the spline 16-1a. When the tooth number of the sun gear and the tooth number of the ring gear are set to "Zs" and "Zr", respectively, as is well known, the rotational ratio of the output axis (the carrier 16) to the input axis (the ring gear 20) is "Zr/(Zs+Zr)". That is, the rotational velocity of the output axis is reduced to the input axis and the suitable reduction ratio can be determined by appropriately selecting the tooth numbers. In this time, since the inner cylinder 536 (an extending portion from the sun gear 18) and the engagement projection 10-2 in which the one-way clutch 570 is disposed are also fixed, this is the same situation that the one-way clutch 570 is not disposed (both the inner race side and the outer race side are fixed).

Figure 22:
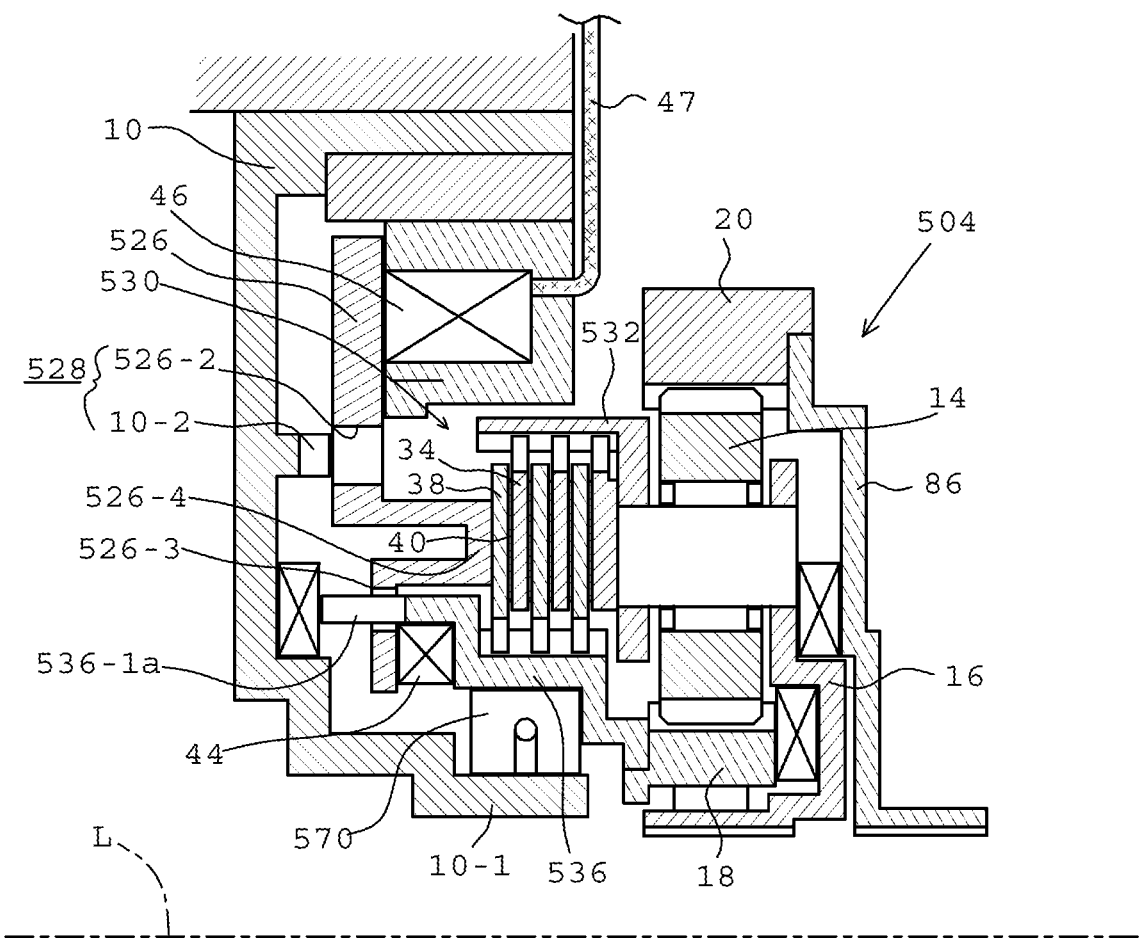
FIG. 22 shows the two-speed transmission apparatus of the sixth embodiment according to the present invention as well as FIG. 21, and shows a state that the dog clutch is not engaged and the friction clutch is engaged.

During the high vehicle velocity driving, the electromagnetic coil 46 is electrically energized, the armature 526 is driven to the rightward by the electromagnetic force against the spring 44, as shown in FIG. 22, and the dog clutch 528 becomes a non-engaging state that the engagement portion 10-2 of the housing 10 is released from the engagement hole 526-2 of the armature 526. By the operation of the driving portion 526-4, the friction clutch 530 becomes an engaging state that the driving plates 38 engage with the driving plates 34 via the clutch facings 40. Accordingly, the sun gear 18, the ring gear 20 and the carrier 16 of the planetary gear mechanism integrally rotate, and the rotation of the electric motor rotational axis is transmitted to the wheel side with a one-to-one relationship. The transmission ratio of the transmission 504 in the high vehicle velocity driving becomes the higher gear ratio than that in the low vehicle velocity driving. The high vehicle velocity driving can be performed in a state that the rotational number of the electric motor is suppressed, that is, the high vehicle velocity driving can be performed (the high vehicle velocity can be obtained) with a margin to the maximum velocity. Since the rotational direction of the inner cylinder 536 (the rotational direction of the sun gear 18) is the same as the arrow "a" direction (an opposite direction of the projection direction "f" of the cams 572) in the operation of the one-way clutch 570 (FIG. 23), the one-way clutch 570 is idle.

When switching from the low vehicle velocity driving (FIG. 21) to the high vehicle velocity driving (FIG. 22), a situation that the dog clutch 528 and the friction clutch 530 are a non-engaging state can instantaneously be occurred. In this moment, the cams 572 in the one-way clutch 570 prevent the backward movement for the torque interruption that the rotation of the sun gear 18 of the outer race side is opposite to the electric motor rotational direction "a". That is, since the outer race side in the cams 572 is locked to the housing side and the rotation of the electric motor rotational axis can be transmitted to the wheel side, the torque interruption is prevented until the friction clutch 530 is completely transited to an engaging state. If the friction clutch 530 completely becomes an engaging state, the one-way clutch 570 is an idle state by the rotation of the sun gear 18 whose rotational direction is the same as the electric motor rotational direction "a".

Even when switching from the high vehicle velocity driving (FIG. 22) to the low vehicle velocity driving (FIG. 21), a situation that the friction clutch 530 and the dog clutch 528 are a non-engaging state can instantaneously be occurred. In this moment, the cams 572 in the one-way clutch 570 prevent the backward movement for the torque interruption that the outer race side moves to the backward direction which is opposite to the rotational direction of the electric motor rotational axis. That is, since the outer race side in the cams 572 is locked to the housing side and the rotation of the electric motor rotational axis can be transmitted to the wheel side, the torque interruption is prevented until the dog clutch 528 is completely transited to an engaging state.

EXPLANATION OF REFERENCE NUMERALS 2 electric motor for running
4, 104, 204, 304, 504 two-speed transmission
6 reduction mechanism
10 housing
12 planetary gear mechanism
14 pinion
16 carrier
18 sun gear
18-2 clutch recess portion
20 ring gear
26 armature
26-1 clutch projection portion
26-4 flange portion (friction clutch driving portion)
28, 328, 428, 528 dog clutch
30, 430, 530 multi-plate friction clutch
34 driven plate
36 inner cylinder
38 driving plate
40 clutch facing
43 pressure receiving plate
44 elastic body
46 electromagnetic coil
70, 470, 570 one-way clutch
72, 472, 572 cam
228 first-speed multi-plate friction clutch
230 second-speed multi-plate friction clutch

The invention claimed is:
1. A two-speed transmission for an electric driving vehicle disposed on an output axis of an electric motor in a vehicle which uses said electric motor for driving wheels, comprising:
    a housing fixed to a vehicle body side,
    a planetary gear mechanism which is disposed in said housing and comprises three rotational components including a carrier to rotatably support plural pinions disposed at a circumferential direction with an interval, a first gear whose rotational center is common to said carrier and which meshes with said pinions, and a second gear whose rotational center is common to said carrier, whose tooth number is different from a tooth number of said first gear, and which meshes with said pinions,
    an elastic body,
    an electromagnetic coil,
    an armature which is movable along an input axis, is rotated with said input axis, is moved to and is urged to a first direction by said elastic body, and is moved to and is urged to a second direction which is opposite to said first direction by an electromagnetic force generated from said electromagnetic coil,
    a first clutch which is engaged by movement of said armature to said first direction by an elastic force of said elastic body when said electromagnetic coil is not electrically energized, and is not engaged by movement of said armature to said second direction by said electromagnetic force against said elastic force when said electromagnetic coil is electrically energized, and
    a second clutch which is engaged by said movement of said armature to said second direction by said electromagnetic force against said elastic force when said electromagnetic coil is electrically energized, and is not engaged by said movement of said armature to said first direction by said elastic force when said electromagnetic coil is not electrically energized,
    wherein a ring gear or a sun gear as a first rotational component of said planetary gear mechanism is fixed to said housing, one of second and third rotational components is an input side rotational component and the other of said second and third rotational components is an output side rotational component, and said first and second clutches between said input side rotational component and said output side rotational component are determined such that a rotational velocity of said input side rotational component is equal to that of said output side rotational component when one of said first and second clutches is engaged and the other of said first and second clutches is not engaged, and said rotational velocity of said input side rotational component is not equal to that of said output side rotational component and a rotational direction of said input side rotational component is the same as that of said output side rotational component when one of said first and second clutches is not engaged and the other of said first and second clutches is engaged, and
    wherein, comparing a first case that said first clutch is engaged and said second clutch is not engaged by said movement of said armature to said first direction under said elastic force when said electromagnetic coil is not electrically energized with a second case that said first clutch is not engaged and said second clutch is engaged by said movement of said armature to said second direction under said electromagnetic force against said elastic force when said electromagnetic coil is electrically energized, a ratio of said rotational velocity of said output side rotational component to said rotational velocity of said input side rotational component in said first case is lower than that in said second case.

2. The two-speed transmission for an electric driving vehicle according to claim 1,
    wherein said first clutch is a dog clutch and said second clutch is a friction clutch.

3. The two-speed transmission for an electric driving vehicle according to claim 2,
    wherein said dog clutch comprises
    a first portion which is integrated with said armature, and
    a second portion which is integrated with said planetary gear mechanism side including said housing,
    wherein said first portion is engaged with said second portion by said movement of said armature to said first direction and said dog clutch is engaged, and
    wherein said first portion is separated from said second portion by said movement of said armature to said second direction and said dog clutch is not engaged.

4. The two-speed transmission for an electric driving vehicle according to claim 2,
    wherein said armature is integrated with friction clutch driving portions,
    wherein said friction clutch driving portions are separated from an opposite surface of said friction clutch and said friction clutch is not engaged in said movement of said armature to said first direction, and wherein said friction clutch is engaged by said movement of said armature to said second direction.

5. The two-speed transmission for an electric driving vehicle according to claim 1, further comprising a one-way clutch for preventing torque interruption when switching between said first case and said second case.

6. The two-speed transmission for an electric driving vehicle according to claim 5, wherein said one-way clutch is locked for surely transmitting driving force via said second and third rotational components and preventing said torque interruption.

7. The two-speed transmission for an electric driving vehicle according to claim 5, wherein said one-way clutch locks said first rotational component to said housing and surely transmits driving force from said input side rotational component to said output side rotational component for preventing said torque interruption.

\* \* \* \* \*